Sept. 5, 1939.  E. M. SCHANTZ  2,171,602
APPARATUS FOR GIVING INFORMATION CONCERNING STOCKS AND BONDS
Original Filed April 22, 1933   12 Sheets-Sheet 1

Inventor:
Edwin M. Schartz
By Rector, Hibben, Davis & Macauley, attys.

Sept. 5, 1939.  E. M. SCHANTZ  2,171,602
APPARATUS FOR GIVING INFORMATION CONCERNING STOCKS AND BONDS
Original Filed April 22, 1933  12 Sheets-Sheet 2
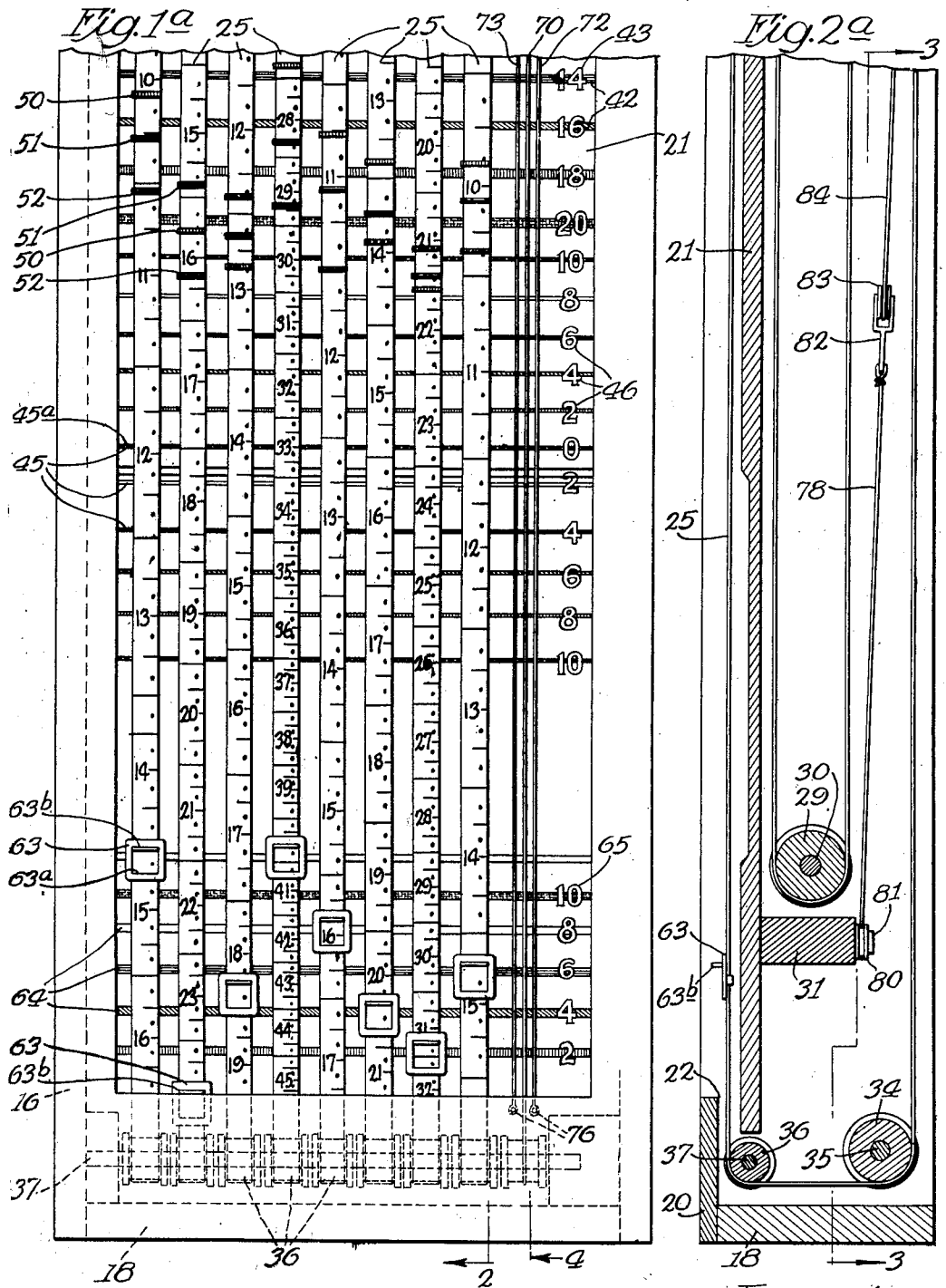
Inventor
Edwin M. Schantz
By Rector, Hibben, Davis & Macauley, Attys.

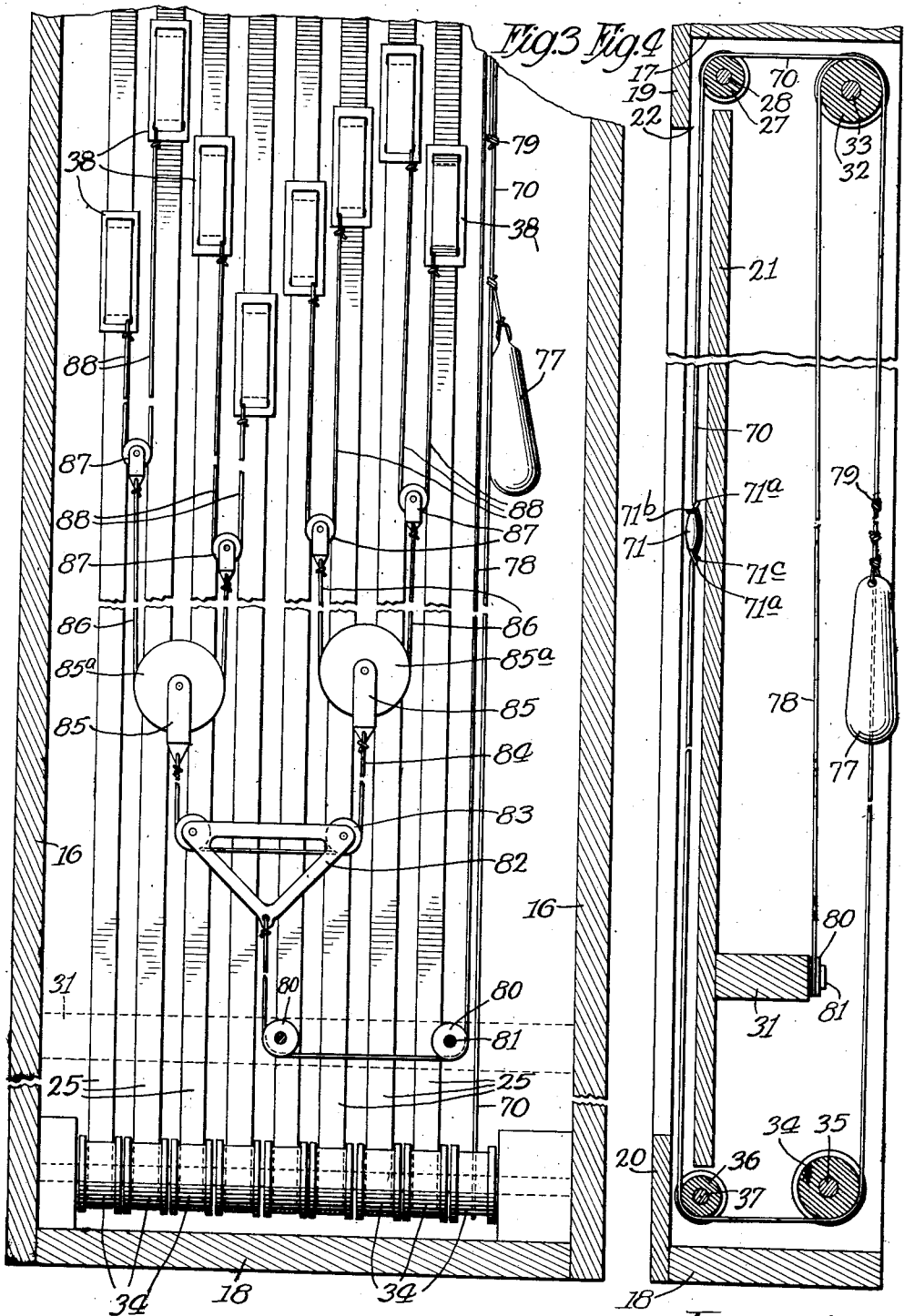

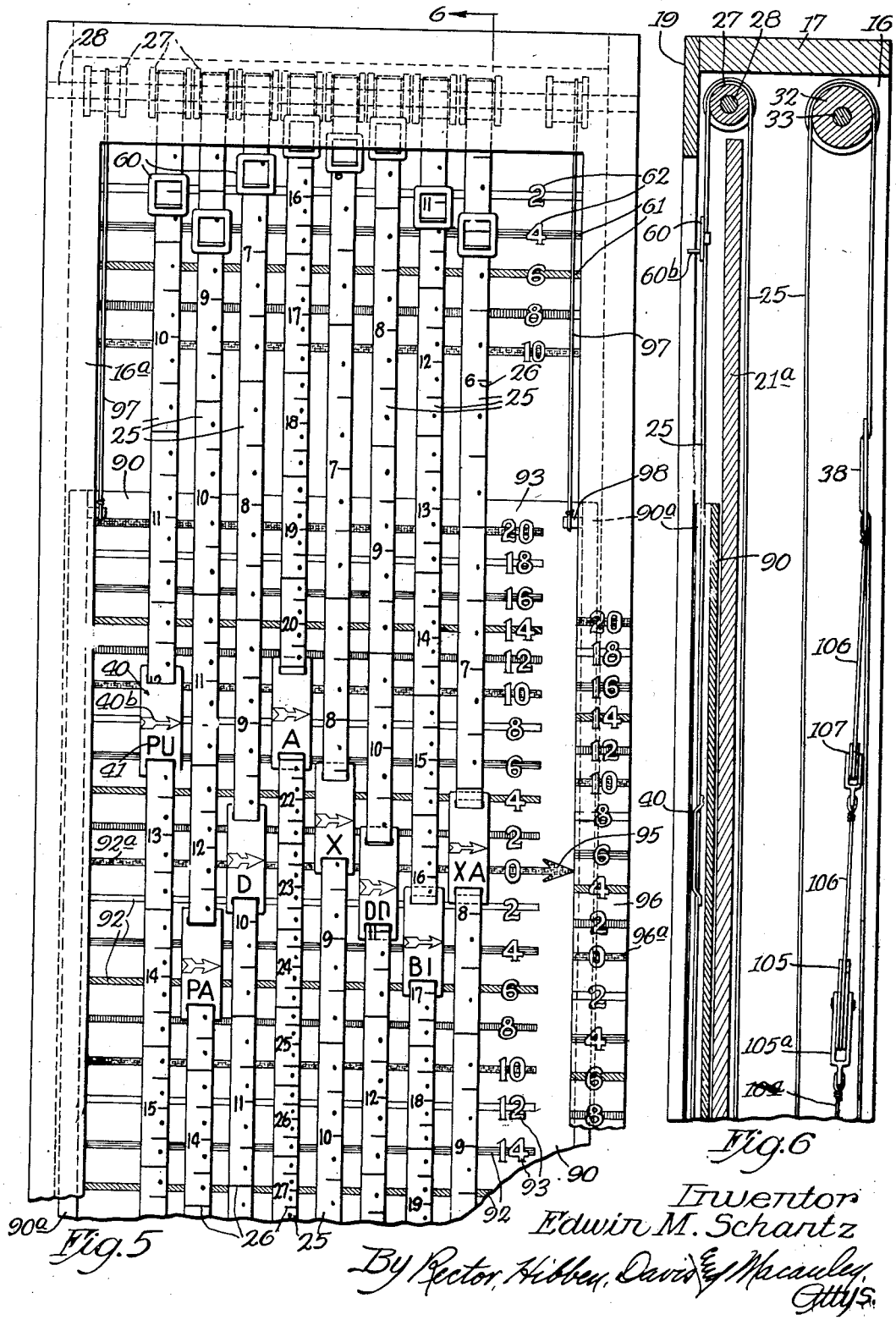

Sept. 5, 1939.　　　　　E. M. SCHANTZ　　　　　2,171,602
APPARATUS FOR GIVING INFORMATION CONCERNING STOCKS AND BONDS
Original Filed April 22, 1933　　12 Sheets-Sheet 5
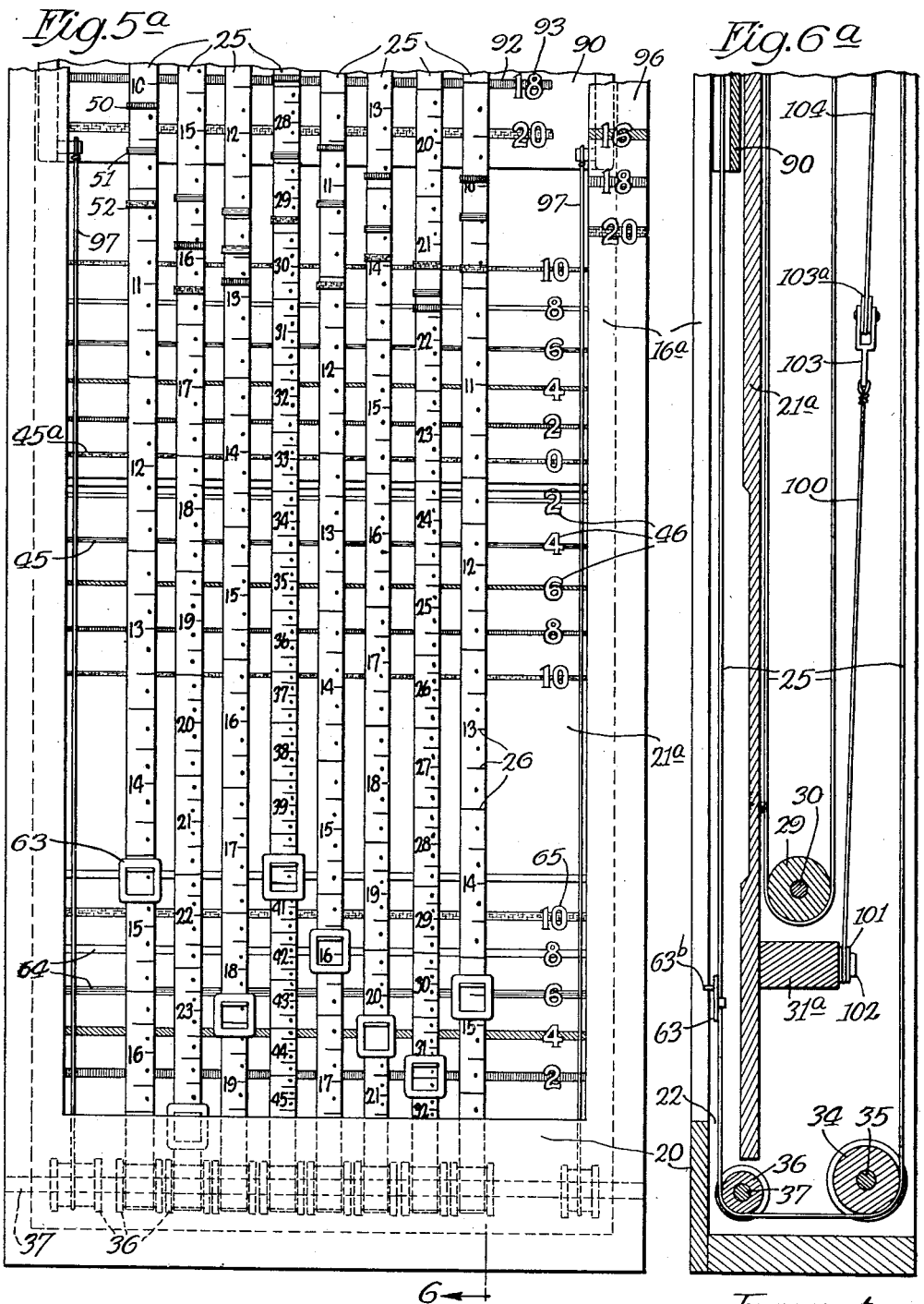
Inventor:
Edwin M. Schantz
By Rector, Hibben, Davis & Macauley, Attys.

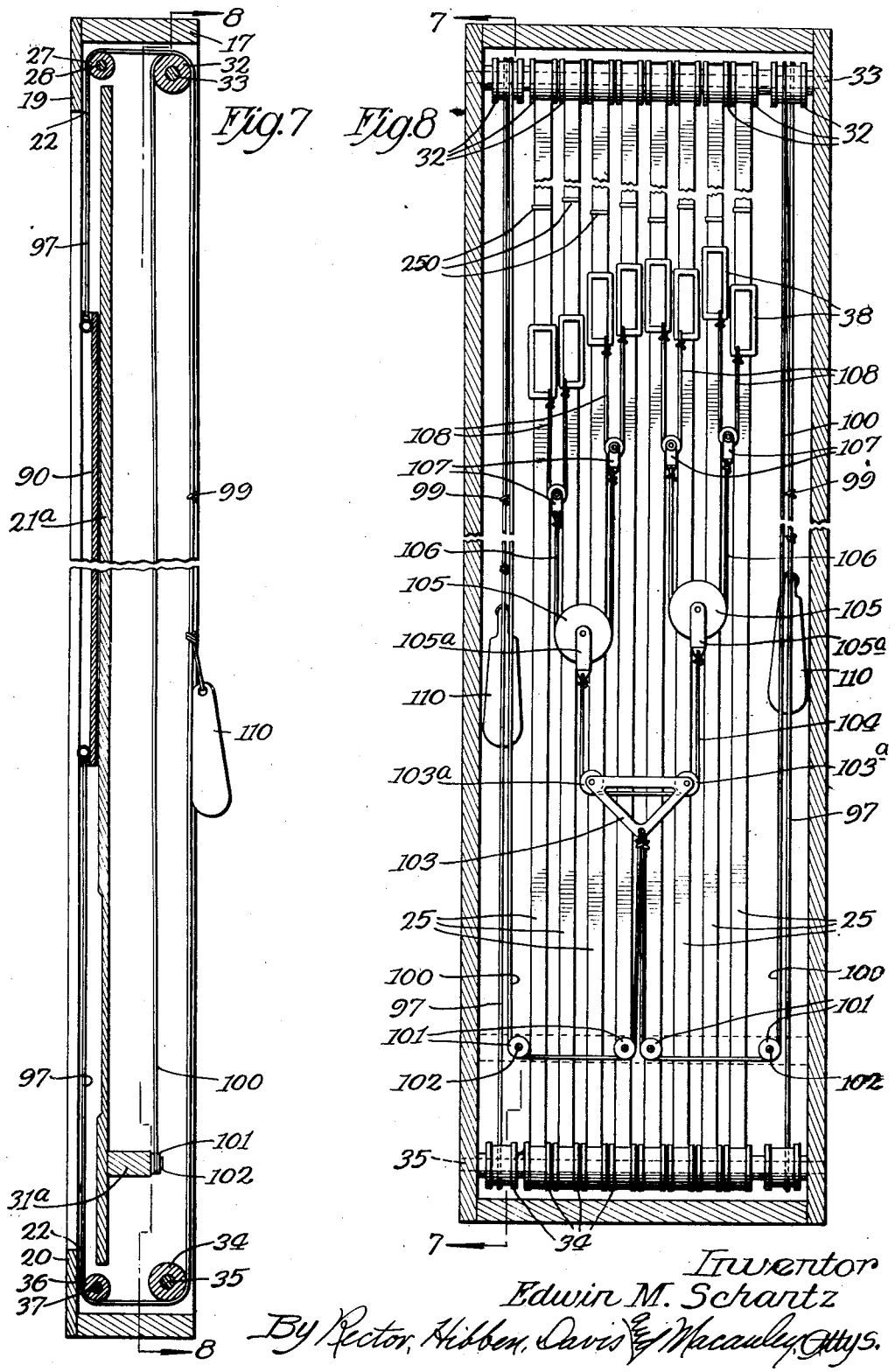

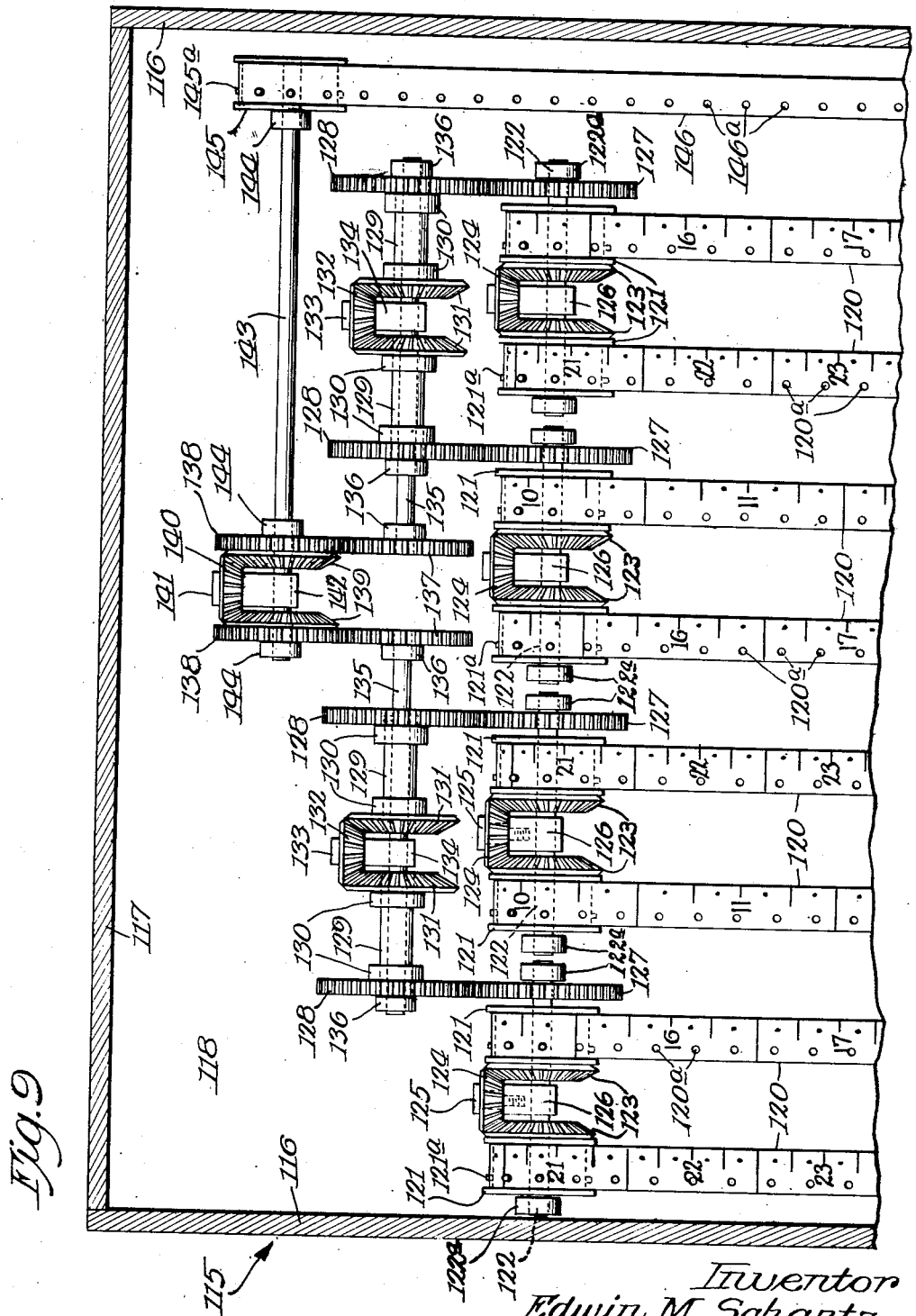

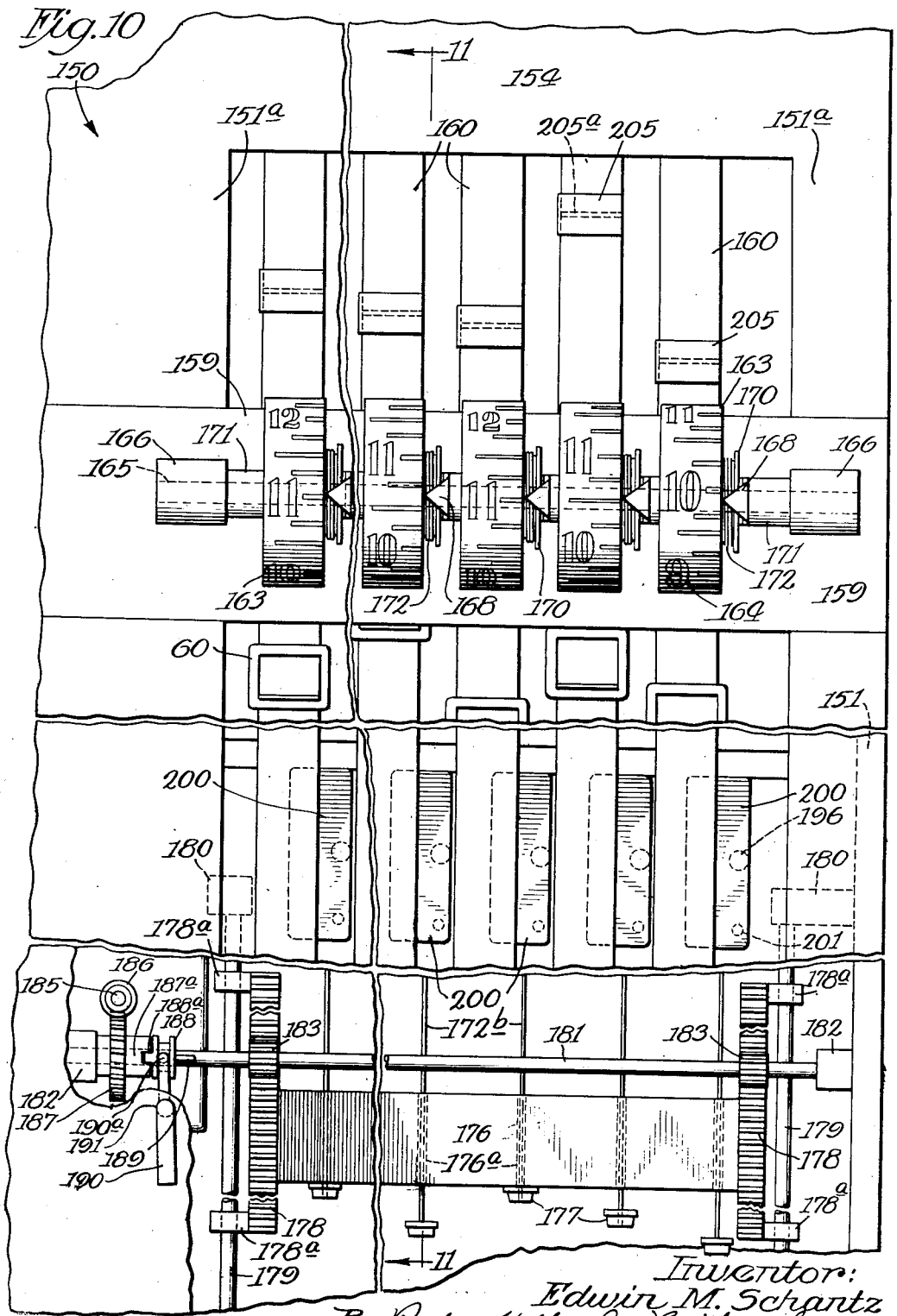

Sept. 5, 1939. E. M. SCHANTZ 2,171,602
APPARATUS FOR GIVING INFORMATION CONCERNING STOCKS AND BONDS
Original Filed April 22, 1933 12 Sheets-Sheet 9
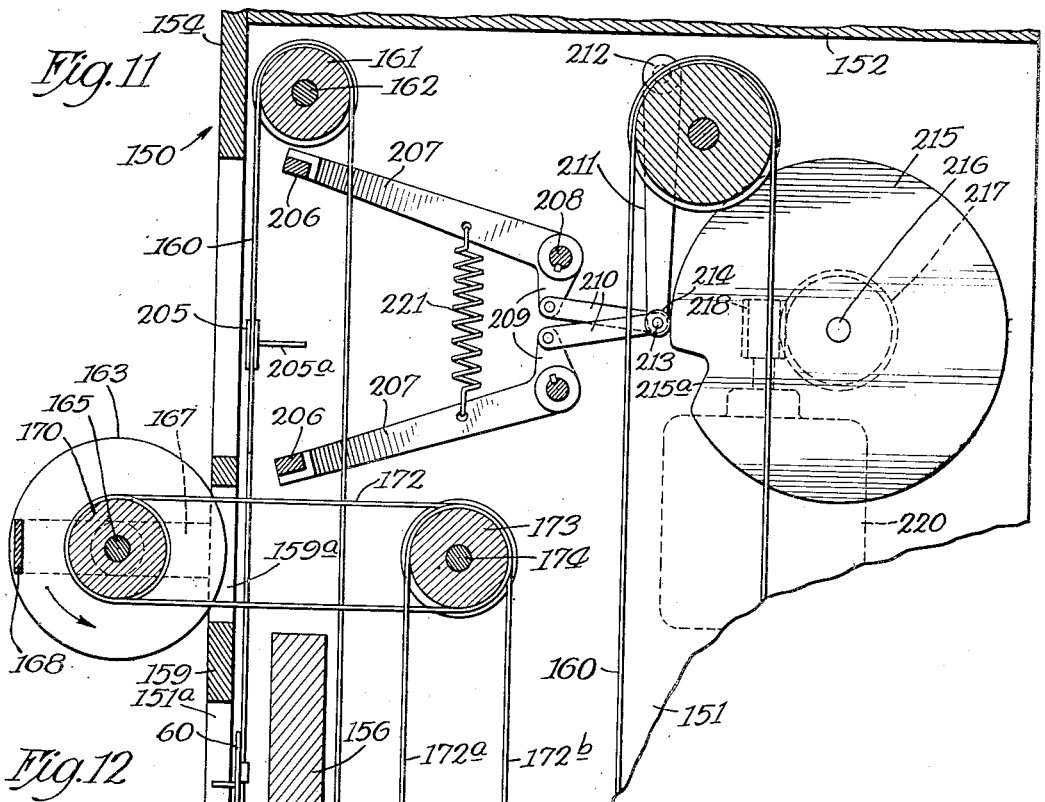
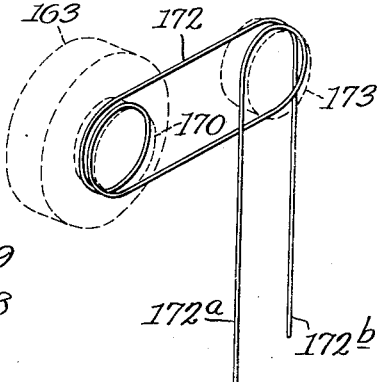
Inventor
Edwin M. Schantz
By Rector, Hibben, Davis & Macauley Attys.

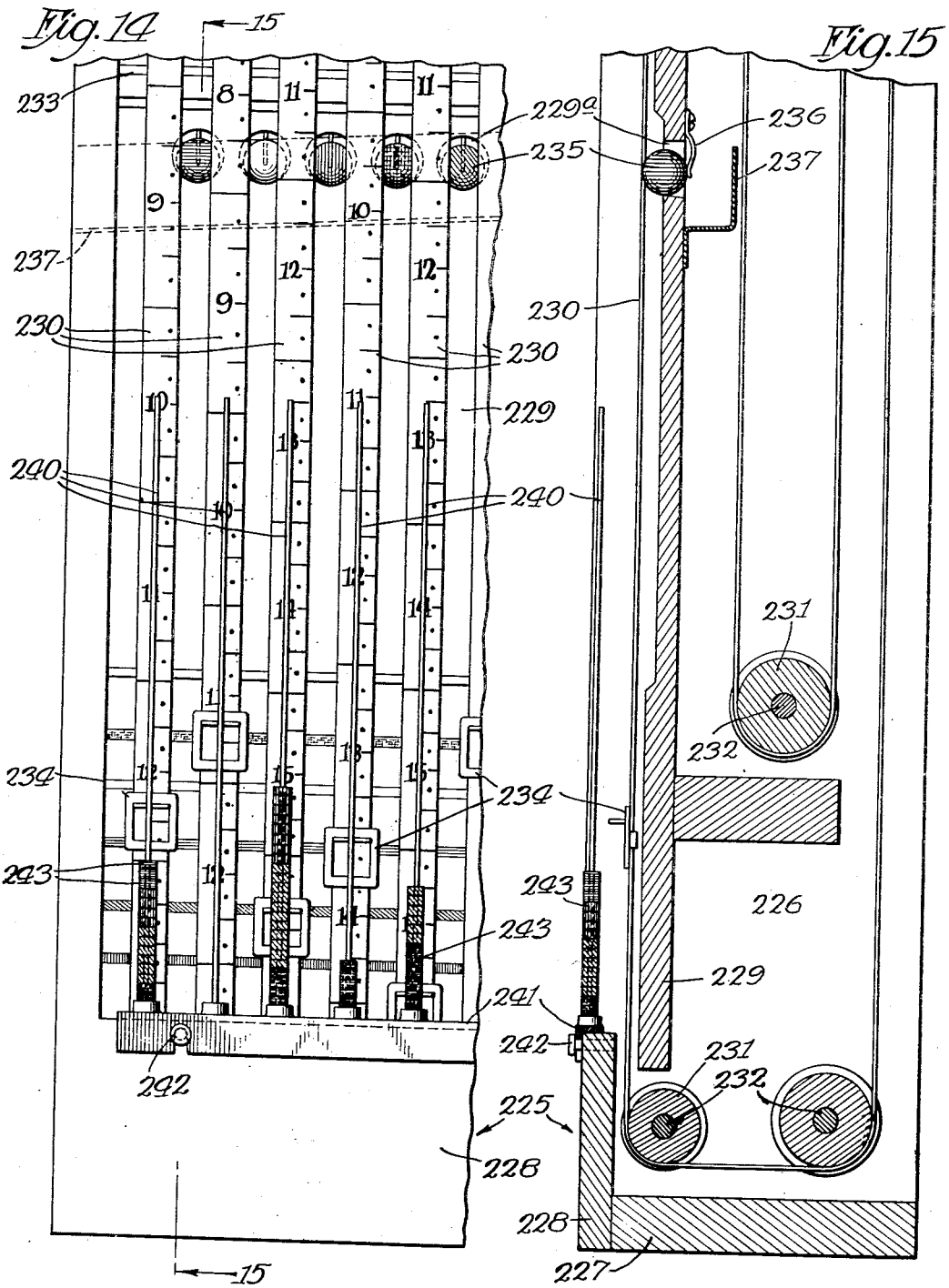

Sept. 5, 1939.   E. M. SCHANTZ   2,171,602
APPARATUS FOR GIVING INFORMATION CONCERNING STOCKS AND BONDS
Original Filed April 22, 1933   12 Sheets-Sheet 11
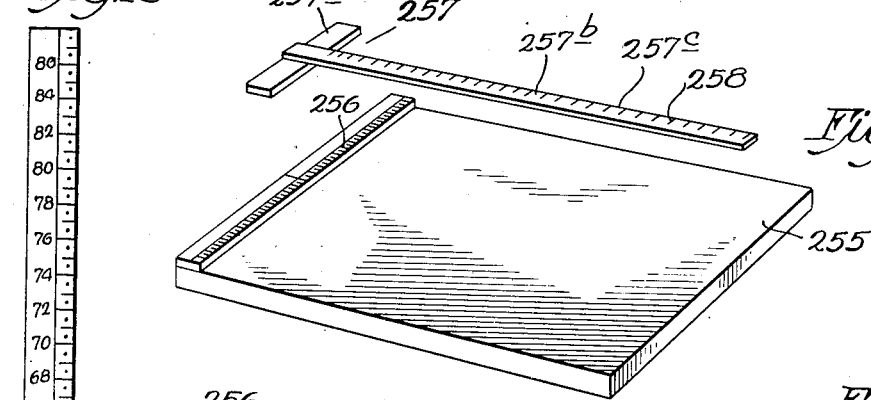
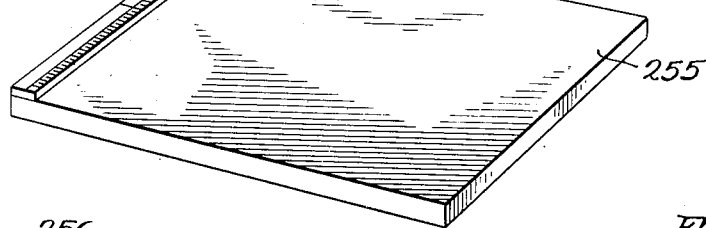
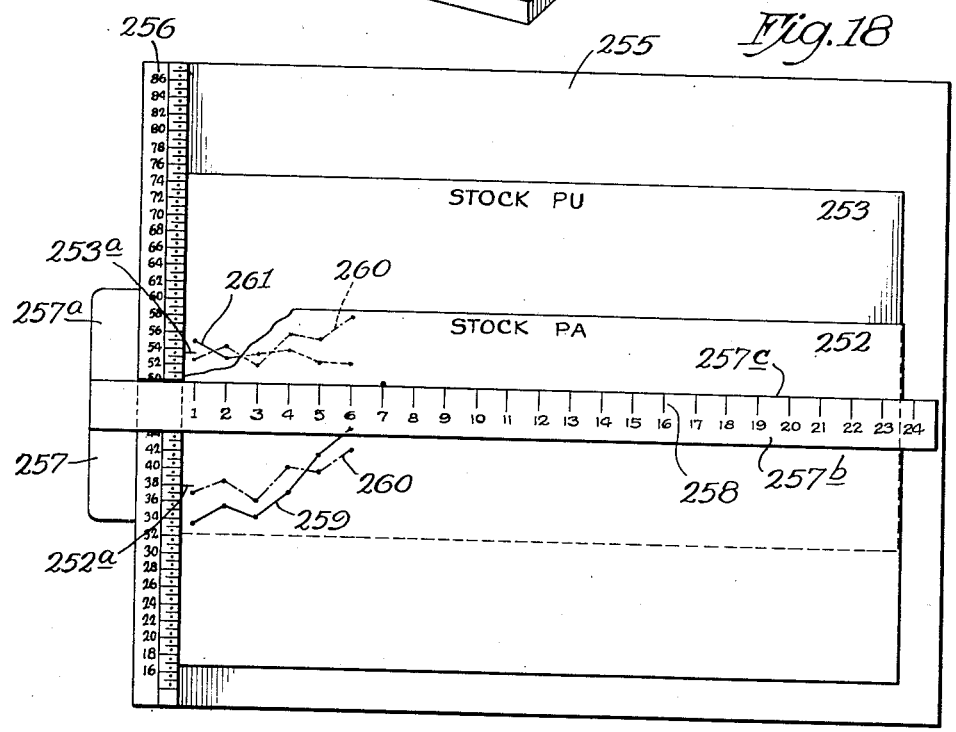
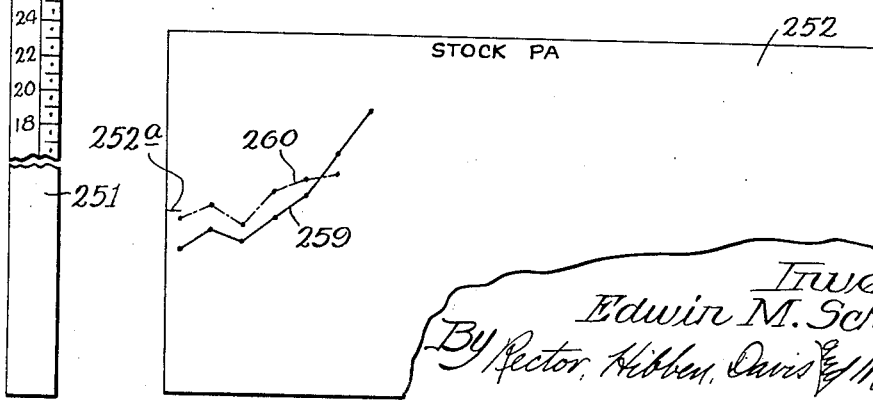
Inventor
Edwin M. Schantz
By Rector, Hibben, Davis & Macauley
Attys.

Sept. 5, 1939.  E. M. SCHANTZ  2,171,602
APPARATUS FOR GIVING INFORMATION CONCERNING STOCKS AND BONDS
Original Filed April 22, 1933  12 Sheets-Sheet 12

Fig. 20

Inventor
Edwin M. Schantz
By Rector, Hibben, Davis & Macauley, Attys

Patented Sept. 5, 1939

2,171,602

UNITED STATES PATENT OFFICE 2,171,602

APPARATUS FOR GIVING INFORMATION CONCERNING STOCKS AND BONDS

Edwin M. Schantz, Dayton, Ohio, assignor to the firm Davis, Lindsey, Smith & Shonts, Chicago, Ill., a partnership Application April 22, 1933, Serial No. 667,398
Renewed December 3, 1938

36 Claims. (Cl. 116—130)

This invention relates to improvements in apparatus for supplying to traders therein certain information concerning stocks and bonds being traded in on the stock exchanges, whereby such traders are assisted in trading more intelligently. Heretofore, the information regarding the price values of stocks, for example, and the fluctuations in such prices which have occurred on the floor of the stock exchanges, have been posted on blackboards in the customers' rooms of brokers' offices in such a manner as to indicate the prices of successive sales, the high and low prices for the day, and the closing price of the preceding day, for each stock. By examining the notations on such a blackboard, a trader in stocks may observe whether any given stock has gained or lost and the extent of such gain or loss and can, by mental computation, compare the gain or loss of any particular stock with the gain or loss of any other stock in the group for the purpose of determining, for example, whether any given stock should be bought or sold at a particular time, if a profit is to be made. The information which can thus be acquired is incomplete and often not well founded and the method of obtaining it is somewhat laborious and time consuming so that no intelligent plan of trading in stocks can be quickly determined upon by examining the usual stock broker's blockboard.

The principal object of the present invention is to overcome the difficulties encountered in the method, or lack of method, heretofore employed by providing a novel form of apparatus which continuously displays the price movements of all stocks traded in on a stock exchange as these prices fluctuate, the changes being computed on a logarithmic scale in order to provide a common term or medium by which the changes in price of each stock are measured so that the fluctuations in the prices of the various stocks may be compared with each other and the relation of the change of any stock to the changes in the other stocks recorded visually so that, with the information thus acquired, the customer is in a position to determine accurately the value, for trading purposes, of any particular stock at a given moment, this information being supplied continuously while the stock exchange is open and almost simultaneously with the changes in the prices of stocks as they occur on the floor of the exchange. A further object of the invention is to provide apparatus which computes and indicates continuously throughout the day the price change of each stock with respect to its price position at the beginning of the day or at the beginning of some other predetermined period so that the relative movements of all stocks may be visually compared. Still another object of the invention is to provide apparatus for showing the price fluctuations of stocks from a multiple of starting points such as from the beginning of the day and also from the beginning of each of several preceding days, as well as from the beginning of any given pronounced movement or swing in the trend of the market. A further feature of the invention is the provision of means for showing the changes in the prices of the several stocks from their respective highest and lowest points for the day.

Still another object of the invention is to provide apparatus embodying a differential indicating system whereby changes in the prices of various stocks may be shown and computed from certain definite starting or conversion points which are not the same for each and every stock as, for example, when the visual record of the price fluctuation of one stock shows the price change since the beginning of periods starting, respectively, several hours earlier or at the beginning of any one of several preceding days, the purpose being to have the indicating system show what might be considered the more advantageous purchasing or selling value of any stock or stocks in relation to the other stock or stocks, by virtue of its position on the scale in relation to the position of the others on the scale. A further object of the invention is to provide means for indicating, for each stock, the price change which has occurred since the beginning of any hour or other period of the day. A further feature of the invention is the provision of means for giving special information with respect to certain stocks, such as the price at which a certain stock has been bought or at which another stock has been sold "short" or the fact that another stock is being sold that day "ex-dividend."

Another important feature of the invention is the provision of means whereby there is a continuous indication throughout the day of the average change throughout the day of the prices of all of the stocks so that the change in price of any stock may be compared with the average change. Another object of the invention is to provide apparatus by which one may determine on a graph of the average price fluctuations of a group of stocks over an extended period, the points at which the prices reached a maximum or a minimum, and the time which has elapsed since any particular stock reached its high or low point. A further object of the invention is to provide means for recording continuously the number of shares of each stock which have been traded in during the day or any hour of the day, the time which has elapsed during the day since the last sale of any stock occurred, the hour of the day when any such sale took place, and other like information concerning the behavior of particular stocks. Other objects relate to various features of construction and arrangement of the apparatus which will appear more fully hereinafter.

The nature of the invention will be understood from the following specification taken with the accompanying drawings, in which one form of the improved apparatus for practicing the present invention and modifications of certain portions thereof are illustrated. In the drawings, Fig. 1 shows a partial front elevation of the upper portion of an indicating device embodying the features of the present invention;

Fig. 2 shows a vertical section taken on the line 2—2 of Fig. 1;

Fig. 1$^a$ is a front elevation of the lower portion of the apparatus illustrated in Fig. 1;

Fig. 2$^a$ is a continuation of the vertical section of Fig. 2 through the lower part of the apparatus illustrated in Fig. 1$^a$;

Fig. 3 shows a partial section on the line 3—3 of Fig. 2$^a$;

Fig. 4 is a vertical section taken on the line 4—4 of Figs. 1 and 1$^a$;

Fig. 5 shows a front elevation similar to that of Fig. 1, of a modified form of apparatus which is adapted to indicate the price fluctuations of the several stocks with respect to the changing price fluctuation of all of those stocks;

Fig. 6 is a vertical section taken on the line 6—6 of Fig. 5;

Figures 1, 2:
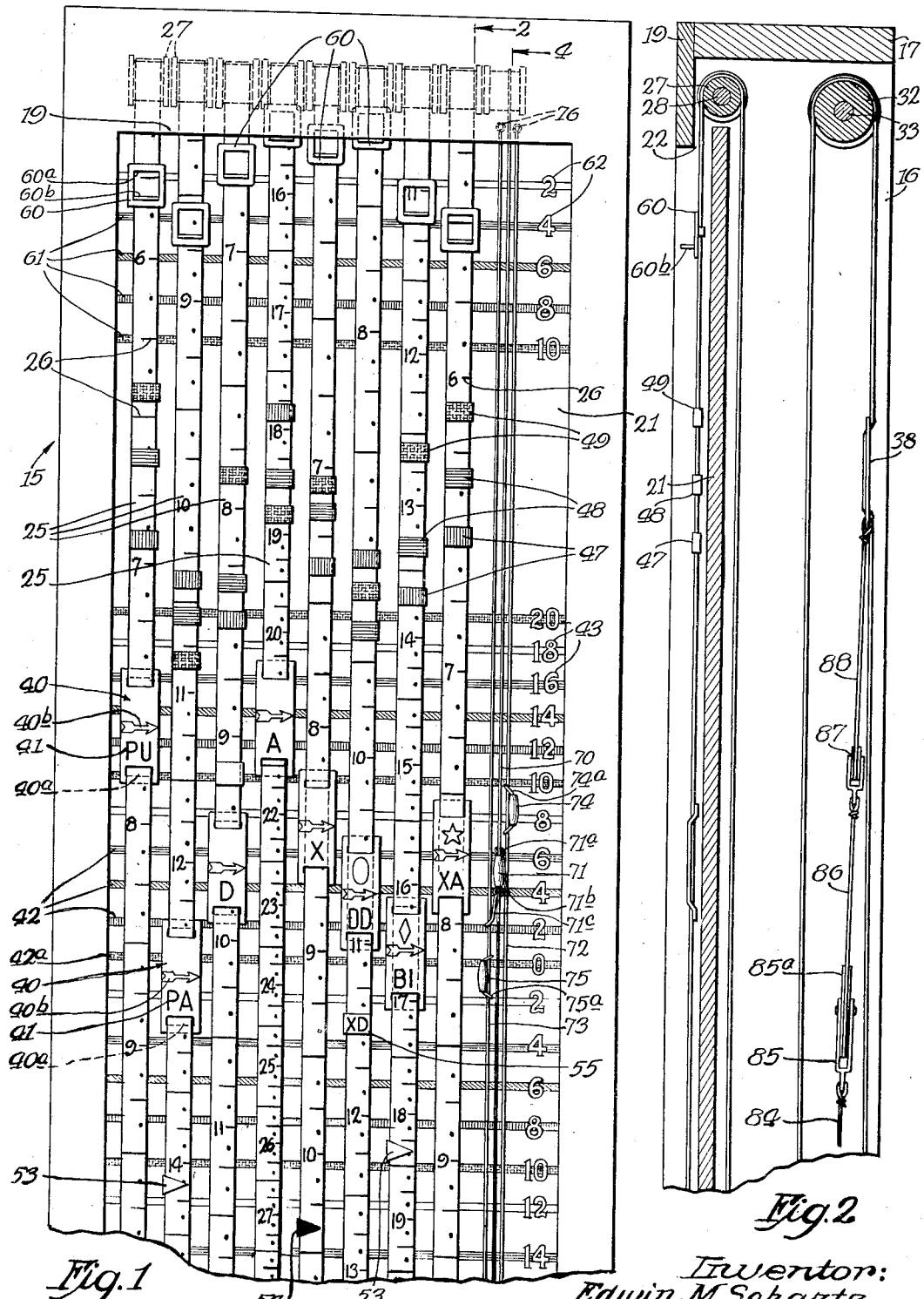

Fig. 5$^a$ is a front elevation similar to that of Fig. 1$^a$ showing a continuation of the disclosure of Fig. 5 from the bottom of Fig. 5 to the bottom of the apparatus;

Fig. 6$^a$ is a continuation through the lower part of the apparatus of the section of Fig. 6;

Fig. 7 shows a complete vertical section on the line 7—7 of Fig. 8 through the form of apparatus shown in Figs. 5 and 5$^a$;

Fig. 8 shows a section on the line 8—8 of Fig 7;

Fig. 9 shows a partial front elevation of a modified form of the invention in which a different form of mechanism is employed for recording the average movements of all of the stocks;

Fig. 10 shows a partial front elevation of a modified form of the invention equipped with means for indicating the time when the last sale of each stock occurred and also with means which is automatically reset at predetermined intervals for indicating the fluctuation of stock prices during those intervals;

Fig. 11 shows a vertical section taken on the line 11—11 of Fig. 10;

Fig. 12 shows a development of the graduated periphery of one of the indicator wheels shown in Figs. 10 and 11;

Fig. 13 is a perspective view showing the means for driving one of the indicator wheels shown in Figs. 10 and 11;

Fig. 14 shows a partial front elevation of another modification of the invention which is equipped with means for indicating the volume of sales of each stock and also with a modified form of device for indicating the time when the last sale of each stock occurred;

Fig. 15 is a vertical section taken on the line 15—15 of Fig. 14;

Fig. 16 shows a graduated scale which may be employed in connection with the indicator board of the present invention for taking off readings of stock price movements for the purpose of making a graph or chart showing the relative fluctuations of the stock prices and their averages at predetermined times on successive days or other periods of time, such as the closing prices on successive days and their averages, for example;

Fig. 17 shows a perspective view of a drawing board and a T-square which are graduated for use in making a graph or chart of the fluctuations of stock prices and their averages obtained from the indicator board with the use of the scale shown in Fig. 16;

Fig. 18 shows a top plan view of the drawing board and T-square shown in Fig. 17 with a number of sheets superimposed upon the drawing board to carry the graphs of the price fluctuations of a number of individual stocks as well as the average prices of the stocks;

Fig. 19 is a top plan view of one of the graphs or charts of a particular stock after it has been removed from the drawing board where the successive points of the graph or curve are located; and Fig. 20 contains a table or curve showing the spaced relation of successive numbers on each of the graduated tapes embodied in any of the forms of modifications of the invention, in order that equal percentages of change in stocks selling at different prices will be represented by equal movements of the corresponding markers carried by the tapes.

Although the uses and advantages of the invention are by no means limited and the information given by the improved apparatus herein described may be employed in various ways, it may be desirable in order to facilitate the understanding of the apparatus to state generally, in advance, one specific use to which the more general features of the invention may be put. It is well known to close observers of the operation of a stock exchange that the prices of the various stocks listed have a habit of advancing or declining more or less together, particularly when the market is in a disturbed state, and this general movement is known as the trend of the market. It is also true that not all stocks follow this trend, perhaps because of internal conditions of the companies represented by these stocks, and that the stocks do not follow the trend with equal speed or in equal degree. There are always stocks which lag behind the general movement of the others, as well as some stocks which move more rapidly and in advance of the general movement of the others. Therefore, it is possible to compute the value of the trend of the market and also the value of any particular stock which has not yet responded to the trend, and deal in this last named stock accordingly, with a profit to the trader. While this lag or time element of certain stocks may extend over the close of the market to another day, thus enabling one to take some advantage of the trading possibilities by observing the reported prices of the stocks after the closing of the market, it usually happens that this lagging occurs throughout the day and is of short duration and, if one is to take advantage of it, it is necessary to trade in the stock before it has adjusted itself to the general trend. It would be a practical impossibility to acquire the necessary information by observation and calculation during the day while the stock exchange is open and trading going on, but by the use of the present invention, the trader is enabled to observe the relative prices of the various stocks with respect to the general trend or movement of the market so that he can determine instantly at any period of the day which stocks, because of the rate or magnitude of their price changes, are desirable one in which to trade. This visual indication is given by providing apparatus comprising a plurality of endless tapes, each tape representing one of the stocks traded in upon the stock exchange, and each tape bearing a series of numbers or divisions representing the prices at which the stock may be sold. The spacing of the divisions on the various tapes is arranged according to a logarithmic scale so that equal percentages of change of value in stocks selling at widely different prices will be represented by equal movements of their respective tapes with respect to a stationary indicator carried by the apparatus and extending horizontally across the face of the board over which the tapes move. When a sale in any stock occurs, the tape representing that stock is moved by the attendant to bring in registry with this indicator line the price at which the stock has just been sold. Corresponding adjustments of the device for the other stocks are made as sales occur and these adjustments of the tapes bring about the movement from their initial positions of a sries of indicators each of which is normally stationary on one of the tapes and each of which is adapted to show by the magnitude of its movement the percentage of change in the price value of that stock which has occurred since some predetermined time, such, for example, as the beginning of the current day. The positions of these indicators therefore reveal to the trader at any time the relative changes which have been made in the prices of the various stocks and those which have lagged behind the others in the general trend of the market are visually indicated. The trader may therefore select a group of stocks which thus lagged behind the upward movement of the others and buy them with the prospect of selling them later when they have caught up with the general trend. Inasmuch as there might be a reversal in the general trend which would result in a loss even if the trader purchases only those stocks which apparently lag behind the upward trend of the market at the time the purchase is made, it is ordinarily advisable to select also a second group of stocks which are in advance of the general trend and which therefore tend to return to the general average of all of the stocks and to sell "short" a selected group of these last named stocks which are in advance of the others. If, then, there is a change in the direction of the general trend from that which it had when the stock transactions were entered into, a profit will result no matter which way the general average moves. With this general explanation of one possible use of the indicating apparatus, the apparatus illustrated in the accompanying drawings will now be described.

As illustrated in Figs. 1 to 4, inclusive, of the drawings, the invention comprises a board or frame 15 comprising side walls or frame members 16 connected by the top wall 17 and the lower wall 18. The upper and lower ends of the side walls are united with each other and with the top and bottom walls by the vertically extending transverse frame members 19 and 20. Extending between the side walls 16 and located rearwardly of the transverse frame members 19 and 20, is the front board or panel 21 which has its edges secured to the side walls and which terminates short of the top and bottom walls, with slots 22 between its end portions and the adjacent edges of the transverse members 19 and 20. This display board 15 may be of any desired extent and is preferably mounted so that the front board or panel 21 extends vertically. A plurality of tapes 25 are mounted to move over the face of the panel 21 and the ends of these tapes are connected at the rear of the panel so that they act as endless members adapted to be moved independently of each other so as to bring into the desired position on the face of the board any desired one of the graduations 26 which are printed on the faces of the tapes and which are designated by numerals representing the possible prices for the respective stocks which are represented by these tapes. The graduations 26 are spaced apart according to a logarithmic scale so that equal percentages of change in the sales prices of stocks having widely different values are represented by equal movements of the tapes over the face of the board. These tapes are preferably white and are formed of linen or other non-extensible fabric with the graduations printed on the outer surface thereof in black. At the top of the board, they extend over a plurality of independent grooved pulleys or spools 27 which are mounted to rotate independently of each other on a shaft 28 extending between and having its ends secured in the side frame members 16. The tapes then extend downwardly along the rear face of the panel 21 and are passed around another series of grooved pulleys or spools 29 which are mounted upon another shaft 30 mounted between the side frame members 16 immediately above the transverse frame member 31 to which the lower part of the panel 21 is attached. After passing around the pulleys 29, which are capable of independent rotation on the shaft 30, the tapes again extend upwardly and are passed around another series of grooved pulleys or spools 32 which are rotatable independent of each other on another shaft 33 having its ends secured in the side frame member 16 adjacent the top member 17. The tapes then extend downwardly from the pulleys 32 and are passed around another series of pulleys 34 mounted to rotate independently of each other on a shaft 35 extending between the side frame members 16 adjacent the bottom wall 18. The tapes then extend forwardly and around a final series of grooved pulleys or spools 36 which rotate independently of each other on a shaft 37 secured between the side frame members 16 beneath the lower end of the front panel 21, after which the tapes extend upwardly through the lower slot 22 and along the face of the panel 21 to the upper end thereof where they pass through the upper slot 22 to the pulleys 27. The ends of each tape are united with each other by being overlapped and passed through the slots of friction buckles or plates 38 which are of rectangular form and which are provided with horizontal slots at their upper and lower ends adapted to be engaged by the overlapping ends of the tape somewhere along the rear stretch of the tape between the pulleys 32 and the pulleys 34. Each tape then acts as a continuous endless member and may be readily manipulated by the operator grasping the portion thereof which lies in front of the panel 21 in order to move the front stretch of the tape vertically and thereby position any desired graduation on the tape at a selected location on the board.

Each of the tapes 25 has mounted thereon in front of the panel 21 an indicator 40 in the form of a plate formed of metal, fibreboard or other material having considerable stiffness. Each indicator 40 is provided with slots 40ª extending transversely thereof adjacent its ends and the tape is threaded through these slots and along the rear of the indicator so that the intermediate front portion of the indicator is exposed. This exposed portion of each indicator has printed thereon a symbol 41 which is the usual market designation for some particular stock. For example, in the embodiment illustrated, the symbols "PU", "PA", "D", "A", "X", "DD", "BU" and "XA" appear on the separate indicators and identify these respective indicators and their associated tapes with the stocks represented by these symbols. In addition, each indicator 40 carries at its middle point an index mark or pointer 40ᵇ which is adapted to be brought into registry with any one of the lines which extend transversely along the face of the board to indicate the spaced relation of certain graduations which represent percentages of change of stock prices from an initial zero position or base line or which represent percentages or units of change in sales prices and the like. These indicators 40 are movable with the tapes 25 by reason of their frictional engagement therewith but they may be moved longitudinally of their respective tapes in order to bring them into any desired initial position.

The panel 21 is provided in a region midway between the upper and lower edges thereof with a series of transverse stationary indicators 42 which may be in the form of relatively wide stripes painted on the face of the panel. These stationary indicators are identified along one vertical edge of the panel by numerals 43 which represent percentages of change on a logarithmic scale in sales prices in both directions from an initial position represented by the zero line 42ª. In order that these stationary indicating lines may be readily distinguished from each other, they are preferably painted in different colors, the zero line 42ª being preferably orange or yellow and the other lines or stripes being of other colors such as red, green, blue, white and the like. A sufficient number of these stationary indicators are provided to indicate changes of 20% on a logarithmic scale in the sales prices of stocks in either direction from the initial position. Another region of the panel 21, preferably located below that occupied by the indicators 42, is provided with another series of transverse horizontal stationary indicators 45 in the form of lines pointed on the face of the panel, preferably in different colors, and identified at their ends adjacent one edge of the panel by numerals 46 which represent increments of change on a logarithmic scale in the actual sales prices of stocks above or below an initial sales price represented by the zero line, 45ª, also preferably colored orange or yellow, for example.

While the stock market is in session, the prices given by the usual stock ticker for the sales of the various stocks are recorded continuously and successively on the apparatus of the present invention by an attendant who moves the tapes 25 to bring into registry with the zero line 45ª of the stationary indicators 45, the graduations or numerals 26 on the various tapes which represent the last sales of the stocks represented by those tapes. For example, if stock "A" sells at 33, the tape 25 representing that stock is adjusted to bring the numeral 33 in registry with the zero line 45ª and then, if the next sale is at 33½, the tape is again adjusted to bring the graduation 33½ in registry with this zero line. The tapes representing the various other stocks are similarly adjusted and it will be understood, of course, that in actual practice the extent of the indicating apparatus of the present invention will be much greater than that illustrated so that there will be a sufficient number of tapes 25 to permit the use of tapes for identifying all of the principal stocks traded in on the exchange. In this way, the latest sales price of each stock is always indicated by the numeral on the tape which is in registry with the zero line 45ª so that a trader can determine at a glance the latest sales prices of each stock, more readily than it can be determined by the usual inspection of the broker's blackboard. In addition, the adjustment of the tapes in response to changes in the sales prices of stocks causes the board to reveal other information including the percentage of change of the sales price of each stock from the position it held at the beginning of the day or at some other time. For indicating the percentages of change from the initial position at the beginning of the current day, the indicators 40 are utilized and the zero line 42ª is taken to indicate the initial position of the stocks if the sales prices of the stocks be considered as being converted to zero or to 100%, for example, at the beginning of the day. In order to bring this about, the indicators 40 on the tapes 25 are all adjusted longitudinally of the tapes at the beginning of the day in order to bring their index pointers 40ᵇ into registry with the zero line 42ª. Then, as sales of the various stocks occur on the exchange, the successive adjustments of the tapes which are required in order to bring the latest sales prices into registry with the zero line 45ª will cause the indicators 40 to move upwardly or downwardly with the tapes, depending upon whether the sales prices increase or decrease, respectively. The indicators 40 will move at different rates and have different degrees of movement each of which is revealed to the trader in percentage at any time by inspecting the position of the index mark 40ᵇ of any selected indicator with respect to the percentage indicator lines 42 and the trader is thus able to determine which stocks have had the greatest percentage of change from their initial position and which stocks have lagged to the greatest extent behind the general trend of the market for the day and he is thereby enabled to govern his purchases or sales accordingly. If the trader is operating on the theory that the stocks which have risen to the greatest extent from their initial positions will be most likely to return toward that initial position, those stocks may be selected to be sold "short" while other stocks which have had no movement or a very small movement from their initial positions, or which have moved in the other direction, may be selected to be bought, on the theory that these stocks will tend to move toward the general or average position represented by the trend of most of the other stocks. The positions of these indicators 40 over the face of the board thus indicate to the operator at any time a more or less general and imaginary line of irregular form showing whether the general trend of the market has been upward or downward for the day. At the beginning of another day, the indicators 40 are all again returned to a position where their index marks register with the zero line 42ª, but the tapes 25 remain where they were with certain of the graduations or figures 26 thereon registering with the zero line 45ª to indicate the closing sale prices for the preceding day.

In addition to indicating percentages of change of the stocks from their initial positions for the current day, the indicating apparatus of the present invention may also be employed for indicating percentages of change from the beginning of different days and from the beginning of some pronounced stock selling price movement. For this purpose, the user of the board is furnished with a number of removable markers or clips which may be attached to the tapes 25 to remain thereon and move therewith until they are again detached. These markers may include one series 47 colored red, another series 48 colored blue, another series 49 colored yellow, all representing movements since the beginning of different days, and an additional set of markers for indicating the change since the beginning of a pronounced trend. These markers are adapted to be used in conjunction with any of the stationary transverse indicators 42 which may be arbitrarily selected as a zero line from which percentages or degrees of change of sales prices are to be indicated from the beginning of some day or period other than the current day. For illustration, the red clips 47, each of which is in the form of a metal clip of U-shaped cross-section having arms adapted to extend on opposite sides of and frictionally engage the tape, are attached to the tapes at the beginning of a day to register with the uppermost indicating line 42 which is identified as the 20% line, this line being arbitrarily selected as a zero line from which the movement of the markers 47 is to be measured. During the course of the day, these markers 47, or most of them at least, will move from the graduation line 20. At the beginning of the second day, another series of blue markers 48 are placed on the tapes 25 in registry with the graduation line 20 and at the beginning of the third day another series of yellow markers 49 are placed on the tapes 25 in registry with the graduation line 20. Then, at any time during the second day, the positions of the markers 47 will indicate the summation of the changes which have occurred in the prices of the several stocks since the beginning of the preceding day and, at any time during the third day, the positions of the markers 47 and 48 will indicate the summation of the changes which have occurred in the sales prices of the respective stocks since the beginning of the second preceding day and the next preceding day, respectively. In this way, the indicating apparatus may be made use of for revealing instantly to the trader the behavior of any particular stock and the relative behavior of the different stocks over a considerable period of time.

The tapes may also be equipped with other clips of distinguishing colors which may be perferably applied to the lower parts thereof to indicate the changes which have occurred in various stocks since some preceding hour of the current day. For example, the user of the apparatus may be provided with one series of clips 50, colored red, which may be placed on the tapes at 9:30 a. m. in registry with the upper stationary indicator line 45 which is marked "10", this line being taken as an arbitrary zero line from which the changes beginning with different hours of the day are to be measured. Another series of clips 51, colored blue, may be placed upon the tapes in registry with this same line 45, at the hour of 11:00 a. m. and another series of clips 52, colored yellow, may be placed upon the tapes at 12:00 o'clock noon. At any time after one of these series of clips has been put in place, their subsequent positions will indicate to the user of the apparatus the changes which have occurred since the hour when those clips were put in place. These clips are preferably made of different size from those which are used to form the series of clips 47, 48 and 49 and they are placed on the tapes over a different part of the board so that the clips having the same color will not become confused with each other. The history of a general trend or movement may be indicated by distinctive clips or markers which may be placed on the tapes to effect the transposition to a common base line of the prices which existed at the beginning of the movement. In addition, small pointed clips 53, colored white, may be used by the trader for fastening on any selected tape in registry with the price at which a stock has been bought, and other similar pointed clips 54, colored black, may be placed on certain tapes to indicate the prices at which "short" sales have been made. Still another class of metal clips 55, marked "XD", may be provided for placing on any tape which is being sold "ex-dividend" for the current day. When the tape of a given stock is thus marked with a clip 55, it may be desirable at the beginning of the day, after the first sale has been made, to move the indicator 40 for that stock along the tape until it returns to registry with the zero line 42a in order to compensate for the drop in price which normally occurs at the opening of the market on a day when a stock sells at a price which does not include its dividend, thereby causing the indicator 40 for that stock to indicate more accurately for the balance of the day the normal movements of the price of that stock.

The apparatus is also provided with means for indicating the percentages of change of each stock from its high and low sales prices of the day. For this purpose, the tapes 25 are provided with a series of indicators 60 which are in the form of plates formed of metal, fibreboard or the like, and have transverse slots 60ª therein through which the tapes are threaded. The material from which the lower slot is formed is bent outwardly to form a flange 60ᵇ on each indicator. This flange serves as an index line for the indicator and also as a stop to limit the upward movement of the indicator by the engagement of the flange with the lower edge of the top frame member 19. It will be observed that the stock prices printed on the tapes 25 increase downwardly over the face of the board so that when a stock increases in price, the tape is moved upwardly over the face of the board by the operator in order to bring the sales price in registry with the zero line 45ª. The clips 60 are placed on the tapes 25 adjacent the upper part of the panel 21 and as a tape 25 moves upwardly, the flange 60ᵇ of its clip engages the frame member 19 and further movement of the tape will cause the tape to slide through the slots of the clip while the clip will be held stationary against the frame. When the high point of the stock is reached, the clip will be frictionally held on the tape and will return downwardly with the tape so that the extent to which it moves downwardly from the frame member 19 will indicate the degree to which it has fallen from its high position. The upper part of the panel 21 is therefore provided with a series of transverse indicator lines 61, which are painted on the face of the panel, preferably in different colors and which are spaced apart according to a logarithmic scale and identified adjacent one vertical edge of the panel by numerals 62 representing percentages of change of each stock from the high position represented by the lower edge of the frame member 19. Of course, the stocks may have different degrees of movement downwardly from their high positions so that during the course of the day, these clips 60 may occupy various positions over the indicator lines 61, as indicated in Fig. 1. At the bottom of the board, the tapes are provided with another series of indicators 63 which are identical in form with the indicators 60, being provided with slots 63a which are engaged by the tapes and with flanges 63b which project outwardly in position to coact with the upper edge of the lower transverse frame member 20. As the tapes move downwardly in response to a fall in prices, the flanges 63b of the indicators abut against the frame member 20 and when the low position for any stock is reached and the stock then rises from that low position, the indicator 63 will be frictionally held on the tape of that stock in a position corresponding to its low position, so that the degree of change from the low position will be indicated by the position of the flange 63b of the indicator with respect to the indicator lines 64 which are painted across the face of the panel 21, preferably in different colors, and which are identified by numerals 65 arranged along the vertical edge of the panel and representing according to a logarithmic scale percentages of change from the low position represented by the upper edge of the frame member 20.

The apparatus is provided with means for visually indicating the average gain or loss during the day of all of the stocks which are represented by the tapes. For this purpose, the board 15 is provided on its front side with a flexible cord 70 which extends vertically at one side of the series of tapes and which has mounted thereon an indicator 71 in the form of a weight having eyelets 71a at its ends which are frictionally engaged by the cord 70 so that the indicator normally moves with the cord but may be adjusted to any desired position on the cord at the will of the operator. The cord is moved vertically in proportion to the average change in price of all of the stocks represented by the tapes, by means of mechanism hereinafter described, and the position of the indicator 71 with respect to the zero line 42a will show at any instant the percentage of gain or loss of the average of all of the stocks since the beginning of the day, at which time the indicator is adjusted on the cord to register with the zero or base line. At opposite sides of the cord 70 there are mounted two other cords 72 and 73 which have mounted thereon the slidable indicators 74 and 75, respectively. These indicators are also in the form of weights with loops 74a and 75a at their ends for engagement with the respective cords 72 and 73 so that they may be moved longitudinally of the supporting cords which are themselves affixed to the top and bottom frame members 19 and 20 of the apparatus, as shown at the points 76. The indicator 71 is provided with a loop 71b which extends around the cord 72 so that as the indicator 71 moves upwardly in response to a general rise of the average of all the stock prices, the loop 71b engages the indicator 74 and moves it upwardly on the cord 72 until it is finally left in a position representing the highest average value of the stock prices for the day. Similarly, if the average of all of the stock price falls, the indicator 71 moves downwardly and another loop 71c carried by the indicator 71 and surrounding the cord 73, then engages and pushes downwardly the indicator 75 which is finally left in position on the cord 73 to indicate the lowest average value of all of the stock prices for the day. At the beginning of each day, these indicators 74 and 75 may be adjusted into close proximity with the indicator 71 but after a considerable fluctuation of the stock prices they will be spaced from the position of the indicator 71 and will at all times indicate the highest and lowest values of the average stock prices occurring during the current day.

The movable cord 70 which carries the average price indicator 71 is actuated by mechanism shown particularly in Figs. 2a, 3 and 4. At the top of the board, this cord 70 extends over one of the pulleys 27 and an aligning pulley 32 and at the bottom of the board the cord is extended rearwardly beneath one of the lower pulleys 36 and an aligning pulley 34. Between the pulleys 32 and 34 the cord 70 extends vertically and has its ends united so that it forms a continuous endless member. A weight 77 is suspended from this cord 70 at the back of the board and tends to move it in one direction. The movement in the other direction is effected by means of a cord 78 which is secured to the vertical stretch of the cord 70 and which is connected through intermediate mechanism with all of the tapes 25 on the board. As shown in Figs. 3 and 4, the cord 78 is attached to the cord 70 at the point 79 and is then carried upwardly around one of the pulleys 32. From this point, the cord 78 extends downwardly and beneath a pair of pulleys 80 which are rotatably mounted on pins 81 carried by the transverse frame member 31. The cord 78 then extends upwardly and is secured to a triangular bracket 82 which has mounted thereon a pair of grooved pulleys 83 engaged by another cord 84. The ends of the cord 84 are secured to the frames or brackets 85 of a pair of grooved pulley wheels 85a. Each of these pulley wheels 85a is engaged by another cord 86 and each of the cords 86 has its ends attached to the frames of a pair of pulleys 87. The grooved wheels of the last named pulleys are engaged by other flexible cords 88 which in turn have their ends extended upwardly and secured to the previously described friction clamping plates 38 carried by the rear stretches of the tapes 25. In this way, each tape 25 is secured to a flexible member which is in turn connected through intermediate parts with the cord 78 by which the endless cord 70 is actuated. It will be apparent that the movement of any cord 88 in response to a movement of one of the connected tapes 25 will cause a corresponding but proportional decreased movement of one end of one of the cords 88 which in turn will effect a proportionate but decreased movement of one of the pulleys 85a, thereby effecting some movement of the bracket 82 and the cord 78. The movement of each tape 25 is thus transmitted to the bracket 82 to an extent which is proportional to its movement and to the number and position of all of the other tapes so that the resulting movement of the bracket 82 and cords 78 and 70 is a composite or average of all of the movements of all of the tapes, thus causing the indicator 71 to show accurately the movement of the average price of all of the stocks represented on the board.

Instead of indicating the percentages of change of stock prices during the day with respect to an initial position at the beginning of the day and supplementing this by an indication of the fluctuation of the average of all of the stock prices during the day, as in the form of the invention previously described, the apparatus may be equipped to indicate the changes of the prices of each stock during the day with respect to the average change of prices of all of the stocks and this form of apparatus is illustrated in Figs. 5 to 8, inclusive, where those parts which are the same in form as those previously described have been designated by the same reference numerals. In this modification, instead of placing stationary indicator lines upon a fixed panel 21, those indicator lines which are used as a basis for measuring the fluctuation of the stock prices during the day are carried by a movable indicator board 90 which is mounted in front of the fixed panel 21a with its edges located behind the front flanges 16a of the side wall of the apparatus, as shown in Figs. 5 and 6. This indicator board 90 carries a number of horizontal indicator lines 92, corresponding to the indicator lines 42 previously described except that they are movable with the indicator board when the later is moved in response to a change of the average prices of all of the stocks. These indicator lines 92 are identified at one side of the board 90 by numerals 93 which represent percentages of change of stock prices from the base line 92a which is identified as the zero line. The tapes 25 carry indicators 40 bearing symbols 41 representing the various stocks represented by the tapes and these tapes may be provided with the various other markers or indicators previously described. When the tapes 25 are moved, the indicators 40 partake of this movement and thus indicate on the indicator board 90 the percentage of change of the price of each individual stock with respect to the average change of the prices of all of the stocks which is indicated by the zero line 92a. The change of the average price of all of the stocks is indicated by a pointer 95 located at the end of the zero line 92a and movable adjacent a graduated scale 96 which represents percentages of change according to a logarithmic scale of the average prices of all of the stocks from an initial or zero position 96a which may be the average price of all of the stocks at the beginning of the day, for example.

The movement of the indicator board 90 is effected by mechanism similar to that previously described for effecting movement of the indicator 71 and it comprises a pair of flexible cords 97 which are located adjacent the sides of the frame and which have their ends secured to pins 98 fixed on the board 90 adjacent the corners thereof. These pins are preferably fixed in the side flanges 90a of the indicator board which slide beneath the flanges 16a of the side walls of the frame. The upper portions of the cords 97 extend upwardly over two of the pulleys 27 which are mounted on the shaft 28 adjacent the top of the frame. They then extend over two of the pulleys 32 and downwardly around the pulleys 34 and 36 at the bottom of the frame and thence upwardly in front of the stationary panel 21a with their ends secured to the pins 98 on the lower corner of the movable indicator board. The cords 97 thus correspond in their mounting and movement to the endless cord 70 previously described. The rear vertical stretch of each of the cords 97 has secured thereto at the point 99 one end of a flexible cord 100. These cords 100 extend upwardly over the pulleys 32 which are engaged by the cords 97 and thence downwardly at the rear of the stationary panel 21a. The lower portions of these cords 100 are passed around grooved pulleys 101 mounted on pins 102 carried by the lower transverse frame member 31a. After passing around the two pairs of pulleys 101, as shown in Fig. 8, the cords 100 are carried upwardly and attached to the triangular pulley frame or bracket 103 which is similar to the bracket 82 previously described. This frame 103 is provided with grooved rollers or pulley wheels 103a which are engaged by a flexible cord 104. The ends of this cord 104 are attached to the frames 105a of two other pulleys 105. The grooved wheels of the pulleys 105 are engaged by two other cords 106 which extend upwardly and are attached to the frames of pulleys 107. The wheels of the pulleys 107 are in turn engaged by flexible cords 108 which extend upwardly with their ends attached to the clamping plates 38 carried by the flexible tapes 25. In this way, the mechanism which has heretofore been described for actuating the two cords 97 connected to the indicator board 90 responds to any change of movement of any of the tapes 25. The cords 100 have weights 110 suspended therefrom at the rear of the board, as shown in Figs. 7 and 8, to counterbalance the mechanism to effect movement in one direction. By means of this construction, the indicator board 90 is moved in response to each change of the average price of all of the stocks and at the beginning of each day this board may be manually adjusted to cause its pointer 95 to register with the zero graduation of the scale 96 so that the position of this pointer on this scale will thereafter indicate the extent to which the average price of all of the stocks has moved from its initial position at the beginning of the day.

In Fig. 9 of the drawings, there is illustrated a modified form of actuating mechanism for effecting the movement of a member proportional to the average change of the price of all of the stocks represented by the tapes on the board. This form is illustrated as being embodied in indicating apparatus 115 comprising a frame having side frame members 116, a top frame member 117 and a vertical wall 118. In this form, the endless tapes 120 which are graduated to represent the prices of the various stocks according to a logarithmic scale, are provided with series of apertures 120a spaced equal distances apart and located in a row along the edge of each tape for engagement by the teeth of sprocket pulleys which are actuated when the tapes are moved by the attendant to indicate changes in the prices of stock sales with respect to some base line, as heretofore explained. The tapes 120 are arranged to operate in pairs on the mechanism which is actuated by all of the tapes to indicate the average movement of all the stock prices. Each tape passes around a grooved pulley 121 provided with sprocket teeth 121a which are adapted to enter the holes 120a in the tapes as the tapes pass thereover, thus establishing a positive driving connection. The two puleys which are thus connected with two adjacent tapes 120 are rotatably mounted upon a shaft 122 having its ends journaled in bearings 122a which are carried by the vertical wall 118. Each sprocket pulley 121 has a beveled gear 123 fixed to one side thereof and directed toward the corresponding beveled gear attached to the adjacent sprocket pulley. The two beveled gears 123 of each pair intermesh with a beveled pinion 124 which rotates on a trunnion 125 carried by a driving arm 126 fixed on the shaft 122 between the two beveled gears. It will be seen that the rotation of one beveled gear 123 will actuate the pinion 124 and rotate the arm 126 and the shaft on which this arm is mounted. If both adjacent tapes 120 move at the same time in one direction, the rotation of the shaft 122 will be increased and will be proportional to the average movement of both of the tapes. If one tape moves in one direction and one in the other, the resulting movement of the shaft 122 will be proportional in amount and direction to the average of the two tape movements.

In this way, each pair of tapes 120 is connected to actuate a shaft 122 and these shafts are located in alignment with each other across the apparatus. The motion of each of these shafts is transmitted to other mechanism through a gear 127 fixed thereon and meshing with another gear 128 secured on a sleeve 129 journaled in bearings 130 carried by the wall or frame member 118. Two of the gears 128 and two of the sleeves 129 are connected together to operate intervening differential mechanism so that the result of their movements is the average of the movement of two of the shafts 122. This is effected by connecting the adjacent ends of two adjacent sleeves 129 to beveled gears 131 which are driven by the sleeves to actuate an intervening beveled pinion 132 mounted to rotate on a trunnion 133 carried by a driving arm 134. This driving arm is fixed on a shaft 135 which is journaled in these sleeves 129 and also in bearings 136 carried by the frame member 118. One end of each shaft 135 has a gear 137 fixed thereon and the two gears of two adjacent shafts 135 are located in proximity to each other so that the average of their rotative movements may be transmitted through other differential mechanism comprising two gears 138 each of which meshes with one of the gears 137. Each gear 138 carries a relatively fixed beveled gear 139 and these two beveled gears mesh with a beveled pinion 140 mounted to rotate on a trunnion 141 carried by a driving arm 142. This driving arm is fixed on a shaft 143 which is journaled in bearings 144 so that the shaft 143 rotates in proportion to the average movement of all of the tapes 120 which are mounted on the indicating board. This shaft 143 is extended to a point adjacent one side of the board and has a sprocket pulley 145 fixed thereon to drive a tape or belt 146 which is similar to the tapes 120 in that it is provided with holes 146a for engagement by the teeth 145a of the sprocket wheel. The tape 146 may carry an index mark to indicate the average movement of all of the stocks with respect to a stationary scale located on the face of the board or the tape may itself be provided with graduations which are movable adjacent to a stationary index mark.

In Figs. 10 to 13, inclusive, of the drawings there are illustrated other improved features which, if desired, may be applied to the form of apparatus illustrated in Figs. 1 to 4, inclusive, to indicate the time when the last sale of each stock occurred and also to indicate automatically the fluctuations in the sale prices of the stock which occur during successive limited periods.

In this modification or addition, the movable parts of the apparatus are carried by a frame 150 comprising side frame members 151, a top frame member 152, and a top transverse frame member 154, which extends between and is secured to the side wall members 151. Extending between the side wall members 151 and located rearwardly of the plane of the front transverse frame member 154 is a panel 156 corresponding to the panel 21 embodied in the construction shown in Figs. 1 and 1a. The side wall members are provided at their forward edges with inwardly projecting flanges 151a which are connected adjacent the upper part of the apparatus by a transverse plate or frame member 159.

A series of tapes 160, each graduated according to a logarithmic scale to show the possible selling prices of a particular stock, are mounted to move over the face of the panel 156, and these correspond to the tapes 25 previously described. At their upper ends, the tapes pass over individual grooved pulleys or spools 161 which are mounted to rotate independently of each other on a shaft 162 having its ends secured in bearing blocks carried by the side frame members 151. After passing over the pulleys 161, the rear stretches of the tapes 160 extend downwardly and the tapes are then passed around other individual grooved pulleys or spools located at the bottom of the panel 156 so that each tape acts as an endless member and is capable of adjustment by the operator in order to indicate the latest sales price of each stock with respect to a stationary indicator line on the panel 156 which is graduated to bear indicator lines and graduations similar to the lines 45 on the panel 21. Inasmuch as the sales of some stocks occur much more frequently on the stock exchange than the sales of other comparatively inactive stocks, it is often desirable to know the time which has elapsed since the last sale of a particular stock occurred and this is effected in the present invention by providing each tape 160 with a series of time indicator wheels 163, each of which bears on its periphery a series of graduations 164 to represent the hours of the day and fractions thereof. Each indicator wheel is located directly in front of one of the tapes 160 and is mounted to rotate on the common shaft 165 which has its ends mounted in brackets 166 attached to the frame member 159. Adjacent each indicator wheel 163 there is mounted a bracket 167 which is attached to the frame member 159 and which is engaged by the shaft 165. The outer end of each bracket 167 carries a transversely directed pointer 168 located adjacent the periphery of one of the indicator wheels 163 to provide a stationary index with respect to which the time graduations on the adjacent wheel may be read.

A drum 170 is mounted on the side of each indicator wheel 163 and the drums and indicator wheels which are thus located in pairs are spaced from the adjacent bearings and brackets 166 and 167 by means of collars 171. Each drum 170 has wound about it one or more convolutions of a flexible cord or actuating member 172 which extends rearwardly from the drum through an aperture 159a in the frame member 159. This actuating cord is then passed around another drum or pulley 173, a series of which are arranged side by side and spaced apart upon a shaft 174 which extends between the side frame members 151. One end portion 172a of the actuating cord is passed around its drum or pulley 173 and then extends vertically downward with a weight 175 secured to the end thereof. The other end portion 172b of the cord passes over the drum or pulley 173 and then extends downwardly through one of the apertures 176a which are formed in a transverse bar 176. The end of each portion 172b of the actuating cord is secured beneath the bar 176 to a stop member 177 of larger size than the aligning aperture in the bar so that when the cord moves upwardly its movement is limited by the engagement of the stop member with the under side of the bar. The bar 176 extends transversely of the apparatus and has its ends secured to vertically movable rack bars 178. Each rack bar carries a pair of apertured ears 178a which slidably engage the vertical guide rods 179. These guide rods have their ends mounted in brackets 180 which are secured to the side frame members 151. Extending transversely of the machine adjacent the bar 176 is a shaft 181 which has its ends journaled in bearings 182 carried by the frame members 151. This shaft has two pinions 183 fixed thereon to mesh with the rack bars 178 so that when the shaft 181 is rotated, the rack bars and the connected bar 176 are moved vertically. The shaft 181 is driven from a shaft 185 which is in turn actuated by time controlled mechanism so that its rotation is proportional to the lapse of time during the day. Upon this shaft 185 there is fixed a worm 186 arranged to mesh with a worm wheel 187 rotatably mounted on the shaft 181. The hub of this worm wheel is provided with notches 187a adapted to be engaged by the teeth 188a of a clutch member 188 which is splined on the shaft 181 by means of a key 189 and which may be moved into operative engagement with the worm wheel by means of a handle 190 pivoted at 191 and having lugs 190a engaging the annular groove of the clutch member.

When the clutch member is thrown into engagement with the worm wheel 187, the shaft 181 rotates and causes the bar 176 to move gradually upward with a speed which is proportional to the lapse of time, for example, the lapse of time from the opening of the stock exchange in the morning. This upward movement of the bar 176 would ordinarily permit the corresponding upward movement of the portions 172b of the actuating cords, thereby rotating all of the time indicator wheels 163 under the influence of the weights 175. However, means are provided for preventing this movement of the cords 172 and the corresponding movement of the time indicator wheels until a sale is made of the stock which is represented by the tape located adjacent the indicator wheel in question. For this purpose, there is provided a transverse frame member 193 which is secured at its ends on the side frame members 151 and which carries on its rear side a layer of leather, felt, or other compressible material 194 against which the vertical portions 172b of the actuator cord 172 is adapted to be held normally in tight frictional engagement with the strip 194 by means of a retaining member 195 in the form of a flat plate which overlaps the adjacent cord 172b and which is carried on the end of a plunger 196. The frame member 193 is provided with a series of apertures each of which is slidably engaged by one of the plungers 196 and each plunger carries a coil spring 197 which bears at one end against the frame member 193 and at the other end against a collar 198 secured on the plunger so that these springs normally move the plungers 196 in a forward direction and thereby cause the retaining members 195 to bear against the cords 172b and thus prevent movement of these cords, even when the bar 176 is moved upwardly to provide a space between the under side of the bar 176 and the stop members 177. When it is desired to release any one of the cords 172b, this is done by moving the associated plunger 196 inwardly by pressing on a plate 200 attached to the forward end of the plunger which extends through an aperture in the panel 156. These plates 200 are adapted to enter depressions 156a in the panel when they are pressed inwardly and, to prevent rotation of these plates and their connected plungers, each plate is provided with a pin 201 which has a sliding engagement with an aperture 156b formed in the panel. Portions of the plates 200 extend into the spaces between adjacent tapes 160 so that they may be readily engaged by the fingers of the operator and be pushed inwardly to release any selected actuator cord 172.

At the opening of the stock exchange, the clutch 188 is thrown out and the bar 176 is moved downwardly, thereby causing the cords 172 to rotate the time indicator wheels 163 to the point where each of the pointers 168 registers with the hour of the day at which the stock exchange opens. The clutch 188 is then thrown into engagement with the worm wheel 187 by actuating the handle 190, thereby causing the bar 176 to move gradually upward a distance proportional to the lapse of time. As the bar 176 moves upwardly, the stop members 177 will retain their previous positions and thus cause each actuator cord to extend below the bar 176 to an extent depending upon the amount of time which has elapsed since the bar began its upward movement. When a sale of any particular stock occurs, the operator then pushes inwardly on the plate 200 associated with that stock, thereby releasing the associated actuator cord 172 and permitting the cord to rotate the associated indicator wheel 163 to an extent which depends upon the length of the cord 172b extending below the bar 176. The associated indicator wheel 163 is thereby rotated to bring into registry with the adjacent pointer 168 the appropriate graduation 164 which indicates the hour of the day when that sale occurred. The operator then releases the plate 200, causing the cord 172 to be again held by the retaining member 195 and since he has at the same time adjusted the tape 160 behind the indicator wheel to indicate on the face of the panel 156 the price at which the last sale occurred, there is then revealed on the face of the board, until the time of the next sale, both the amount and the time of the last sale of the particular stock for which the adjustment has been made.

The structure illustrated in Figs. 10 and 11 of the drawings also includes indicators movable with the tapes for showing the relative changes in the prices of stocks during predetermined intervals with means for automatically resetting these indicators in a zero position at the end of each such interval. These indicators 205 are in the form of metal clips each having flanges adapted to engage opposite sides of a tape for holding the clip in place by friction when the clip is put into position over the edge of the table. Each clip also has a rearwardly extending flange 205a which is adapted to be engaged for sliding the clip longitudinally of the tape to set it in a desired initial position. These clips are placed on the tapes and at the beginning of a predetermined interval they are all in alignment. During this interval, they move more or less from their initial positions depending upon the fluctuations in the prices of the various stocks or other commodities represented by the tapes and at the end of that interval certain mechanism is automatically brought into operation to return them to a position where they again align with each other in the same horizontal plane that they originally occupied, so that they are then in readiness to indicate the fluctuations of the various stocks or the like during the next interval of time. The mechanism for sliding these indicators 205 longitudinally of the tapes 160 and setting them in alignment with each other, comprises a pair of bars 206 which extend transversely of the machine in position to engage the flanges 205ª of all of the clips 205 which are mounted on the tapes. Each end of each bar 206 is connected to an arm 207. These arms are connected in pairs to their supporting shafts 208 which extend between the side frames of the apparatus in which they are journaled. Each shaft 208 has secured thereon a crank arm 209 and the two crank arms for the upper and lower shafts are pivotally connected by links 210 with the lower end of an arm 211 which serves as a pivotal support for the inner ends of these links, being itself pivotally supported at 212 upon the frame of the apparatus. The pin 213 which pivotally connects the arm 211 with the links 210 carries a roller 214 which is adapted to coact with the peripheral surface of a cam 215. The cam is mounted to rotate with a shaft 216 which has secured thereon a worm wheel 217 meshing with a worm 218 secured on the shaft of a driving motor 220. The speed of the motor and the gear ratios between this shaft and the shaft 216 is such that the cam 215 makes one revolution during each interval of time, for example, five minutes, during which the relative movements of the various stock prices are to be shown by the indicators 205. At the end of this interval of time, the roller 214 passes into the notch 215ª of the cam, under the influence of the coil springs 221 which connect the two pairs of arms 207 and at the same time these springs force the bars 206 toward each other so that they engage the flanges 205ª and return the indicators to their initial positions. In this way, the resetting of the indicators 205 is brought about automatically at the end of each one of a series of equal intervals of time.

In Figs. 14 and 15, there is illustrated a form of construction which may be employed to indicate roughly the time when the last sale of a stock occurred and also to indicate the volume of sales of each stock since the beginning of the day. This form of apparatus comprises a frame 225 which includes side frame members 226, a bottom frame member 227, and a lower transverse frame member 228. A panel 229 extends between the side frame members and corresponds to the panel 21 of the form of construction shown in Figs. 1 and 1ª. A series of endless tapes 230 are movable over the face of the panel 229 and are supported at the rear of the panel, as in the preceding forms of construction, by grooved pulleys or spools 231 which are mounted on shafts 232. These tapes 230 are graduated to show the prices at which the respective stocks represented by the tapes may be sold. The tapes are adapted to be adjusted to show the last sale prices with reference to a stationary indicator line 233 carried on the face of the panel and the tapes may be provided with any of the indicators previously described, such as indicators 234 which show the various variations of the stock prices from their respective minimum prices for the day. As a means for indicating approximately the time when the last sale of each stock occurred, the panel 229 is provided with a series of circular apertures 229ª adapted to receive the spherical balls 235 which are mounted behind the tapes 230 and held in place by spring clips 236 secured on the back of the panel. The bottom wall of each aperture 229ª is inclined downwardly and rearwardly so that when sufficient pressure is exerted on any one of the balls 235 it may be pushed rearwardly past its spring clip 236 into an inclined chute 237 which conveys them into a suitable receptable at the side of the apparatus. Several series of balls 235 are provided, each series being of a distinctive color and representing a particular hour of the day. If a sale of a particular stock occurs during the first hour of the day, of example, a ball representing that hour of the day is inserted in the aperture 229ª of the tape representing that stock and is allowed to remain there until the next sale occurs when it is pushed rearwardly into the chute 237 and a new ball is inserted of the color which represents the hour during which the second sale was made. When a sale of a particular stock occurs, the ball opposite that stock may preferably be pushed out of the registering hole which is then allowed to remain vacant until the end of the hour, for example, to indicate that a sale has occurred within the current hour. At the end of the hour a ball of the appropriate color is inserted in the aperture to show, until another sale, the fact of a sale during that hour. In this way, the color of the balls present in the apertures behind the tapes for the respective stocks will indicate the hour or hours of the day when the last sales occurred.

The apparatus shown in Figs. 14 and 15 also includes a series of rods 240 which are mounted upon an angle bar 241 adapted to seat upon the upper edge of the lower transverse frame member 228 to which it is detachably secured by screws 242. These rods extend upwardly each in alignment with one of the tapes 230 and they are adapted to receive small rings 243 which may be placed over the upper ends thereof and allowed to slide downwardly until they rest in stacks extending upwardly from the bottoms of the rods. Each ring 243 may represent one hundred shares of stock, for example, and when a sale of one hundred shares of any particular stock occurs, as shown by the stock ticker, the attendant adjusts the tape for that stock to show the last sales price thereof and also places upon the rod in front of that stock one or more rings 243 to represent the number of shares of stock sold. In this way, the accumulation of rings may be made use of to indicate the total shares of each stock which have been sold since the opening of the market on a particular day. If desired, the rings 243 may have a distinctive color for each hour of the market day, such as red, yellow, green, blue and the like, so that the trader can determine from the number of rings of each color on a particular rod, the numbers of shares of that stock which were sold during each hour of the day.

In addition to the various uses of the indicating apparatus which have heretofore been explained, the movements of the graduated tapes in response to changes in stock prices may be utilized for acquiring information to plot graphs or curves showing the fluctuation of the closing stock prices, for example, from day to day, and the average closing prices of all of the stocks, or fluctuations from one hour to the next, or for various other more or less extended periods, the information for which is not visually indicated on the face of the board. Although the information needed for preparing such a graph or chart might be acquired from the face of the board, it may usually be more conveniently obtained by reference to the back of the board where the return portions of the endless tapes may be provided with indicators 259 (Fig. 8) in the form of metal clips which are initially placed upon the tapes in a horizontal row at the beginning of some period, such as at the beginning of a certain day. The subsequent movement of the tapes in response to changes in the prices at which the various stocks are sold will result in movement of these markers to various different levels indicating the relative movements of the various stocks and showing at the end of the day, for example, the relative closing prices of the various stocks. The operator may then measure the distance of the various markers from some common base line, such as the floor of the room on which the indicator board rests, and the information thus gained is used in preparing the graph or chart of each stock. This may conveniently be done by employing a scale 251 having the form shown in Fig. 16, which is graduated from the bottom upwardly. This scale is put alongside the return portion of the endless tape for each of the various stocks and the elevation of the marker on that tape above the floor is measured on the scale. In this way, readings are obtained for the markers on the tapes of each of the stocks and also of the position of a marker on the return portion of the flexible member which carries the indicator for showing the movement of the average price of all of the stocks.

The operator then prepares a number of paper sheets 252, 253, etc., which are to carry the graphs of a number of separate stocks identified as "PU", "PA", etc. Upon the edge of the sheet 252 there is placed an index mark 252a and on the edge of the sheet 253 there is placed a similar index mark 253a, located along the vertical edge of the sheet and preferably midway between the upper and lower edges thereof. These sheets are then superimposed upon each other on a drawing board 255 which has along the left-hand edge thereof an elevated scale 256 bearing on its face, in reduced spaced relation, the same graduations as are borne by the scale 251 which was used in obtaining the readings from the markers on the tapes. The sheets 252, 253, etc., are then adjusted in position on the board 255 until their index marks 252a, 253a, etc., are located opposite the graduations on the scale 256 which correspond, respectively, to the readings which have been taken on the scale 251 for the positions of the markers on the tapes representing those respective stocks to which the paper sheets correspond. Having placed the sheets on the board 255, a T-square 257 is placed on the board with its short arm 257a bearing against the end of the board and the long arm 257b thereof extending over the uppermost paper sheet. The arm 257b of the T-square is provided with graduations 258 which represent successive days or other intervals of time. This arm is positioned with its upper edge 257c in registry with that graduation on the scale 256 which corresponds with the zero or base line on the back of the indicator board on which the markers 259 were initially set. The superimposed paper sheets are then pricked with a needle or other sharp instrument which is placed against the edge 257c of the T-square in registry with the first graduation thereon. This provides the first points on the graphs to be plotted on each of the sheets when these sheets are subsequently removed from the board. After having obtained the initial points for the individual graphs on the separate stocks, the sheets are then re-located on the board with their index lines 252a, 253a, and the like, in registry with each other and with the graduation on the scale 256 which represents the initial position of the markers on the indicator board. The measurement having been taken of the position of the marker on the back of the board representing the position of the average price of all of the stocks, the sheets are then punched to locate the first point on the graph of the average price of all of the stocks, which average is to be plotted on each of the sheets. At the end of the second day, for example, the operation is repeated, thereby obtaining the second points on the graphs of the individual stocks and also the second points of the average prices of all of the stocks for each sheet. After this has been done for several days, the points on the sheets are connected by lines, thus forming on the sheet 252 a graph 259 of the fluctuation of the closing prices of the stock represented by that sheet over a period of several days. On the same sheet there is shown a graph 260 representing the fluctuation of the average closing prices of all of the stocks over the same period of time. The same graph 260 for the average prices of all of the stocks will appear also on the sheet 253 and on each of the other sheets but each other sheet will have an individual graph 261 representing the fluctuation of the closing prices of the individual stock represented by that sheet.

In the foregoing description of the invention, with its various modifications or additions, reference has been made to the fact that the graduations on the tapes, such as the tapes 25, and the indicator lines of certain of the scales on the board, such as the indicator lines 42, are spaced apart according to a "logarithmic" scale. This unequal spacing of the graduations according to a definite law or plan is necessary in order that equal percentages of change in the selling prices of stocks having various different selling prices will be represented by equal movements of the corresponding indicators, such as the indicators 40, which are carried by the tapes representing these stocks. Thus, adjacent numbers in the lower part of the scale of prices are spaced apart on the tapes much farther than the numbers representing successive higher prices of stocks and there is a gradual decrease in the spaced relation of successive numbers on the scale as the prices increase, it being understood that the tapes representing the different stocks are identical in the spaced relation of their graduations. Similarly, there is a variation in the spaced relation of the indicator lines on the board representing successive increments of increase or decrease in percentage of change in the selling prices of the stocks.

For illustration of the necessity for a different spaced relation of the graduations representing successive selling prices in different parts of the scale of prices, it may be assumed arbitrarily that the distance between the graduations 9 and 10 on one of the tapes is five inches, thus fixing the distance which a marker 40 on this tape must move over the board to indicate a change of ten per cent in the selling price of this stock. If other stocks selling at other prices also experience a change of equal degree in their selling prices, it follows that the spaced relation of the graduations on the tapes for those stocks at the prices for which they are selling must be such that an equal percentage of change will also produce a movement of five inches of the markers 40 carried by the tapes representing those stocks. Thus, the distance on each tape between the numbers 19 and 20 must also be five inches and this will also be true of the distances between the graduations 27 and 30, 36 and 40, 45 and 50, etc. Since the tapes are graduated in eight parts between successive numbers, it follows that the spaced relation of successive one-eighth graduations must also vary according to the part of the scale on which the graduations appear and require, also, a variation in the spaced relation of successive one-eighth graduations between two successive numbers. Having assumed the distance between the graduations 9 and 10 to be five inches, it follows, as hereinafter explained, that the distance between the graduations 10 and 11 on each tape must be four and fifty-two one-hundredths inches in order to represent a ten per cent increase. Similarly, the distances between the graduations 20 and 22, between 30 and 33 and 40 and 44 must be four and fifty-two one-hundredths inches. A distance which would represent a two per cent increase, for example, when applied to one part of the scale carried by the tape, must also represent a two per cent increase when applied to any other part of the scale carried by the tape.

The proper spaced relation of the graduations on the tapes and of the percentage lines on the board may be arrived at in various ways as, for example, by an algebraic equation, but it is now considered preferable to determine the required data in a somewhat empirical fashion, as hereinafter explained, and to plot a curve, as illustrated in Fig. 20, from which the spaced relation of any two successive numbers or the divisions thereof may be readily taken. In this figure, there is shown a sheet 265 bearing near the right-hand margin a column of figures 266 which represent successive numerical graduations from 10 to 50, inclusive, which are to be placed on each of the graduated tapes of the apparatus, the lower and higher members having been eliminated from this drawing for lack of space. At the right of this column of numbers 266 there is a vertical zero line 267 and immediately below each numeral in the column 266 is a horizontal base line 268 extending across the sheet from one side to the other. The distance from the graduation on the tape for each of the numerals shown in the column 266 to the next adjacent numeral on the tape is measured on this sheet 265 from the zero line 267 toward the left along the adjacent base line 268. When this distance has been determined on each base line 268, a vertical line 269 is drawn upwardly from that base line to the next adjacent one above and a series of separate vertical lines 269 are thus located on the sheet to form a composite curve 270 which represents the spaced relation of adjacent numerals on the various parts of the tape identified by the graduations appearing in the column 266. When these distances, representing the spaced relation of successive numerals on the tape, have been determined, as hereinafter explained, those distances may be set down in the vertical column 271, at the right of the column 266, the figures in this column 271 representing in inches the spaced relation between the graduation represented by the numeral next adjacent thereto at the left and the next lower number on the scale. Although the distances between the zero line 267 and the various marks 269 forming the curve 270 do not conform in actual size to the figures appearing in the column 271, the distances of the various marks 269 of the curve 270 from the zero line 267 are located proportionally to scale with sufficient accuracy for practical purposes and they indicate the relative decrease in the spaced relation of successive numbers as one proceeds upwardly along the scale carried by the tape.

In arriving at the proper location of the marks 269 which form the curve 270, it may be arbitrarily assumed to start with that two of the numbers on the scale are spaced a definite distance apart. For example, it may be assumed that the numeral 9 is spaced a distance of five inches from the numeral 10 on the tape and, accordingly, the mark 269 is drawn vertically from the base line 268, immediately below the numeral 10, at a point five inches from the zero line 267, thus locating the initial point on the curve and giving one figure for the column 271. With this distance of five inches as the spaced relation between the graduations 9 and 10 on the tape taken as an arbitrary starting point, the proper spaced relations of the other graduations on the tape are then determined according to this proportion: The sum of any number and its next higher number, divided by two (2), is to the length of the space between any number and the next higher number, as the sum of those two numbers, divided by two (2), is to the length of the space between the first two numbers mentioned. For example, if 9 and 10 are the two first mentioned numbers which are spaced apart a distance of five inches and it is desired to know the proper spaced relation of the numbers 49 and 50 on the tape, the proportion would read as follows:

$$9+10:x::49+50:5$$

The solution of this equation will give ninety-six one-hundredths inches, approximately, as the proper spacing of the numbers 49 and 50 on the tape. In the same way, the proper spaced relation of any other two numbers on the tape may be determined by solving similar equations, after having assumed an arbitrary spacing for the two numbers 9 and 10. The figures thus obtained may then be set down in the column 271 to indicate the spaced relation of each of the numbers in the column 266 with reference to the next lower number.

Having determined with approximate accuracy the figures in inches for the spaced relations of successive numbers as set out in the column 271, these distances may be scaled off from the zero line 267 opposite each of the numbers in the column 266 along the horizontal base lines 268, thus obtaining a number of vertical marks 269, extending upwardly from each of the base lines and forming the successive points on the curve 270. If desired, a continuous curve may be drawn through these marks and the spaced relation of the graduation marks which form divisions of the spaces between two successive numbers may be scaled by measuring the distance between the curve and the zero line 267 at various points along the curve. The spaced relation of successive numbers as they are to appear on the tapes may also be set up on the sheet 265 by marking vertical lines 272 from certain of the base lines 268, such as those extending to the left from such numerals as 20, 30, 40, 50, etc., thus providing a chart in which there is shown visually the actual spaced relation of successive numerical graduations on the tape. When arranged on a tape, these numbers form what may be termed an inverted logarithmic scale, rather than a direct logarithmic scale. The numbers set out in the column 271 and the spaced relation of the graduations on the scale are only approximately accurate but they are sufficiently so for practical purposes and the location of several points on the curve 270 may be checked, for purposes of correction, if desired, since it is obvious that certain numbers on the scale must be spaced apart the same distance as other numbers whose correct spacing is already known. For example, the numerals 18 and 20, 27 and 30, 36 and 40, and 45 and 50 must each be spaced apart a distance of five inches because each of these pairs of numbers represents the same percentage of change in selling price as is represented by a change from 9 to 10. The location of the marks 272 for the numbers 18, 27, 36 and 45, on the base lines 268 extending to the left from the numbers 20, 30, 40 and 50, in the column 266, may thus be readily located in alignment with the mark 269 for the numeral 9 on the curve 270. In this way, the person who prepares the chart 265 may check on the calculations which are made in arriving at the figures set out in the column 271.

After having determined the various points on the curve 270 and the necessary data for the column 271, it is desirable to provide also, at the bottom of the sheet 265, a graduated scale 275 representing percentages of increase in the price values of the stocks and a graduated scale 276 representing percentages of decrease or loss in the price values of stocks. The scale 275 comprises a number of vertical marks or graduations 277 which are spaced apart to represent increments of two per cent increase in the prices of the stocks. Since the spaced relation of the successive graduations on the scale from 50 to 60 represent successive increases of two per cent each, the spaced relation of the marks 277 on the scale 275 may be readily located by plotting the marks 272 on a base line 268 extending to the left of the numeral 60 in the column 266 (not shown in Fig. 20) and then projecting these marks 272 downwardly onto the base line of the scale 275 and higher graduations on the scale 275 may be located in the same way. In a similar manner, the successive marks 278 on the scale 276 which show increments of loss in percentage may be determined by projecting downwardly the graduations 272 on the base line 268 which extends to the left of the numeral 50 in the column 266, since each of these marks 272 on this line represents a two per cent decrease from the next higher graduation on that line. The graduations which are thus obtained for the scales 275 and 276 may be used in plotting, in the proper spaced relation, the stationary indicator lines 42 and other indicator lines on the board of the indicating apparatus which are spaced apart according to an inverted logarithmic scale.

The graduation of the tapes according to an inverted logarithmic scale is now considered preferable, particularly where the apparatus is to be used for giving information concerning stocks traded in on a stock market but for this and other uses of the apparatus it may be desirable at times to graduate the tapes to give information by reference to comparative scales, other than percentage scales, by a physical display which will indicate the relative value of a stock for purchase or scale as compared with other stocks, for example. For illustration, if the tapes are graduated according to the inverted logarithmic scale described above, a ten dollar stock which gains one point will show a ten per cent gain while a stock selling in the neighborhood of one hundred dollars per share, which gains ten points, will show the same percentage of gain and would, according to that system of graduation, present the same advantage for purchase or sale as the ten dollar stock. However, experience has shown that a stock selling at about ten dollars per share is more likely to advance or decline one point than a stock selling at one hundred dollars is likely to advance or decline the same percentage, that is, ten dollars per share. Hence, it will be more advantageous to buy a one hundred dollar stock which has lost ten per cent than to purchase a ten dollar stock which had lost ten per cent and this difference can be taken into account in spacing the graduations on the scale and in plotting a curve similar to the curve 270 shown in Fig. 20. For example, the space between the numbers 99 and 100 on a tape may be made twice as long as it would be if the graduations were arranged according to the logarithmic scale and a corresponding increase may be made in the spacing of other numbers, but in a decreasing ratio, as the numbers approach the lower values, thus giving the resulting spacing which would not be a strict logarithmic spacing but which would show on the face of the board the relative advantage of purchasing or selling stocks having different selling prices which had advanced or declined in varying degree. The variation from an approximate logarithmic curve may be made in irregular fashion when the apparatus is adapted for different uses, thus giving to the curve a more or less zigzag formation. It will be understood that it may be employed to give information concerning bonds or various other commodities or subjects-matter, such as life insurance, where it is desirable to determine averages and relative movements of prices or values of various descriptions.

Although one principal form of the invention and several modifications of or additions thereto have been shown and described by way of illustration, together with an explanation of certain uses of the invention, it will be understood that the invention may be constructed in various forms and that the apparatus may be employed in various ways coming within the scope of the appended claims.

I claim:

1. The combination in stock indicating apparatus, of a series of members each representing a different stock and each having thereon a visible scale indicating prices, means on each of said members movable therewith and relative thereto to indicate on said scale the last selling price of the particular stock as of a selected time, means supporting said members for movement lengthwise thereof and independently of each other in opposite directions, a stationary indicating element common to all said members and with respect to which they are moved to position any selected part of said scale in alignment therewith to indicate the last selling price of the particular stock.

2. The combination in stock indicating apparatus, of series of members each having a scale thereon indicating a range of selling prices of each stock, means on each of said members and adjustable therealong to indicate with respect to said scale a selling price of the particular stock as of a certain time and for visually and physically representing each particular stock, an indicating element common to all of said members, and means for effecting relative movement between each of said members and said element upon changes in price of the stocks represented by said members for visually and continuously indicating in association with said adjustable means and said scales the relative movements of the prices of said stocks.

3. The combination in stock indicating apparatus, of adjustable means representing and visually indicating a range of selling prices for each of a series of stocks, said means including a plurality of members each having a price scale thereon, an indicating element common to all said members, means by which said members and element may be moved relatively to indicate with respect to said scale the last selling price of each stock, said scale on each of said members being calibrated according to a logarithmic scale so arranged that equal percentages of change of price in stocks selling at widely different prices will be represented by equal movements of the respective members representing said stocks relative to said indicating element, and a plurality of additional indicator elements arranged in parallel relation to said first indicating element and spaced apart from each other and said first indicating element to indicate percentage of change in price of each said stock as represented by the extent of movement of each said member.

4. The combination in stock indicating apparatus, of adjustable means representing and visually indicating a range of selling prices for each of a series of stocks, said means including a plurality of members each having a price scale thereon, an indicating element common to all said members, means by which said members and element may be moved relatively to indicate with respect to said scale the last selling price of each stock, and means for indicating change in the average of the selling prices of all of said stocks since a predetermined time.

5. The combination in stock indicating apparatus, of adjustable means for visually indicating the last selling price of each of a series of stocks, said means including a plurality of members each representing a stock and each having a logarithmic scale thereon and representing a selling price range, an indicating element common to all said members, and means by which each of said members and said element may be moved relatively to each other, means for visually indicating according to said logarithmic scale the change in the average of the selling prices of all of said stocks since a predetermined time, said logarithmic scale being so arranged that equal percentages of change of price in stock selling at widely different prices will be represented by equal movements of the respective members representing said stocks relative to said indicating element, and adjustable means for visually indicating the change in the selling prices of said stocks with respect to said average price.

6. The combination in stock indicating apparatus, of adjustable means representing and visually indicating a range of selling prices for each of a series of stocks, said means including a plurality of members each having a price scale thereon, an indicating element common to all said members, means by which said members and element may be moved relatively to indicate with respect to said scale the last selling price of each stock, means for indicating the percentage of change in the selling price of each of said stocks, means for indicating the average selling price of all of the stocks, and means for visually indicating the changes in the selling prices of each of said stocks with respect to the average selling price of all of said stocks.

7. The combination in stock indicating apparatus, of adjustable means for visually indicating the last selling price of each of a series of stocks, means for indicating the average selling price of all of the stocks, means for visually indicating the changes in the selling prices of each of said stocks with respect to the average selling price of all of said stocks, and means for visually indicating the change of said average selling price since a predetermined time.

8. The combination of stock indicating apparatus, of adjustable means for indicating the last selling price of each stock, said means including a pair of relatively movable members, one of which is provided with a scale indicating a range of selling prices, an indicating element on the other of said members adapted, in association with said scale, to indicate the last selling price of the stock, and adjustable means for visually indicating the time of last sale of said stock, which means includes a movable indicator directly associated with the movable one of said members, mechanism for operating said movable indicator, and means adjustably associated with the stationary one of said members by which said mechanism is actuated to start said movable indicating device in operation to indicate a new time of sale of said stock.

9. The combination in stock indicating apparatus, of a series of endless graduated movable members each representing a particular stock, an indicator carried by each of said members and movable thereon to indicate a selling price as of a predetermined time, and a stationary indicator common to all of said members located adjacent the paths of movement of said members and which in association with the graduations on said members indicate the last selling price of each particular stock.

10. The combination in stock indicating apparatus, of a series of movable members representing stocks having different ranges of selling prices and each graduated to show a wide range of its own selling prices according to a logarithmic scale each said scale being so constructed and arranged that equal percentages of change of price in stocks selling at widely different prices will be represented by equal movements of the respective members representing said stocks, a stationary indicator common to all said members and with respect to which said members are each moved to indicate the last selling prices of stock represented thereby, and means for moving said members each independently of the other.

11. The combination in stock indicating apparatus, of a series of movable members representing stocks having different ranges of selling prices and each graduated to show a wide range of its own selling prices according to a logarithmic scale so constructed and arranged that equal percentages of change of price in stocks selling at widely different prices will be represented by equal movements of the respective members representing said stocks, and a stationary indicator located adjacent the path of movement of said members and bearing logarithmic graduations spaced to indicate movement of said members and each of them in terms of percentage of increase or decrease in selling price thereof.

12. The combination in stock indicating apparatus, of a series of members each movable in parallel paths and each bearing graduations on a logarithmic scale representing possible selling prices of a particular stock, said scale being so constructed and arranged that equal percentages of change of price in stocks selling at widely different prices will be represented by equal movements of the respective members representing said stocks, and a common means located adjacent the paths of movement of said members and with respect to which all said members may be adjusted to indicate the latest selling price of each stock represented thereby.

13. The combination in stock indicating apparatus, of an elongated graduated member representing a particular stock, said member being adjustable longitudinally, an indicator movable with said member, a stationary indicator to which said member is adjusted to indicate the last selling price of stock, a second indicator with respect to which said first named indicator is moved upon adjustment of said member for indicating a change in the selling price of said stock during a predetermined time, a third stationary indicator mounted adjacent the path of movement of said member, and another indicator mounted on said member for indicating a change in the selling price of said stock during another predetermined time.

14. The combination in stock indicating apparatus, of an indicator board, a series of endless tapes movable in parallel paths over said board, each of said tapes bearing graduations according to a logarithmic scale to represent the possible selling prices of a particular stock, said board having a stationary indicator with respect to which the graduations on said tapes may be caused to register by the movement of said tapes to indicate the latest selling prices of each of said stocks, and means actuated by the adjustment of said tapes for visually indicating a change in the average selling price of all of said stocks.

15. The combination in stock indicating apparatus, of an indicator board, a series of endless tapes movable in parallel paths over said board, each of said tapes bearing graduations according to a logarithmic scale to represent the possible selling prices of a particular stock, said board having a stationary indicator common to all of said tapes with respect to which the graduations of said tapes may be caused to register by the movement of said tapes to indicate the latest selling prices of each of said stocks, and a plurality of indicators each adjustably mounted on one of said tapes for movement with the latter relative to said stationary indicator, said board bearing graduations according to a logarithmic scale with respect to which the positions of said last named indicators after adjustment of said tapes are adapted to show the relative changes in the prices of the different stocks represented by said tapes.

16. The combination in stock indicating apparatus, of a series of endless tapes movable in parallel paths, each of said tapes representing a particular stock and bearing a series of graduations to represent the possible selling prices of that stock, a stationary indicator common to all said tapes and with respect to which said tapes are adapted to be adjusted to indicate visually the latest selling price of each of said stocks, a plurality of movable indicators each mounted on a separate one of said tapes and movable with the latter relative to said stationary indicator, an indicator board carrying a series of graduations extending transversely to the paths of movement of said tapes, the positions of said movable indicators with respect to said graduations on said indicator board showing the relative changes in the prices of said stocks during a predetermined time, and means associated with said tapes for moving said indicator board in response to the average change in the selling price of all of said stocks.

17. The combination in stock indicating apparatus, of an indicator board, a series of endless tapes extending in parallel paths around said board and having portions thereof over the face of said board graduated to show the possible selling prices of each of a plurality of stocks, said board carrying a stationary indicator with respect to which said tapes are adjusted upon each sale of each stock represented by said tapes to indicate the latest selling price of each of said stocks, a movable indicator, and differential mechanism actuated by the adjustment of said tapes for moving said last named indicator to indicate any change in the average selling price of all of said stocks.

18. The combination in stock indicating apparatus, of an indicator board, a series of endless tapes extending in parallel paths around said board and having portions thereof over the face of said board graduated to show the possible selling prices of each of a plurality of stocks, said board carrying a stationary indicator with respect to which said tapes are adjusted upon each sale of stock represented by said tapes to indicate the latest selling price of each of said stocks, a movable indicator, differential mechanism actuated by the adjustment of said tapes for moving said last named indicator to indicate any change in the average selling price of all of said stocks, and means actuated by said movable indicator for recording the extreme average selling prices of all of said stocks.

19. The combination in stock indicating apparatus, of a movable member representing a particular stock and having a price scale thereon, means for indicating in association with the scale of said member the selling price of the stock represented thereby, and a movable indicator located adjacent said member for indicating the time when the last sale of the stock represented by that member occurred, means for actuating said movable indicator, and means located adjacent said member and connected with said actuating means for setting said indicator in motion to indicate a new time of sale.

20. The combination in stock indicating apparatus, of a movable member representing a particular stock and graduated to show possible selling prices of said stock, a stationary indicator to which said movable member may be adjusted to show the last selling price of said stock, an indicator wheel calibrated to indicate the hours of the day and located adjacent to and out of engagement with said movable member, a stationary pointer mounted adjacent said indicator wheel, and means manually controlled when said movable member is adjusted to show its selling price for automatically actuating the adjacent indicator wheel to indicate the time of the sale.

21. The combination in stock indicating apparatus, of a graduated indicator board, a member movable over the face of said board and graduated to show possible selling prices of a particular stock, said board having a receptacle located in registry with said member, and a removable indicating device located in said receptacle for indicating the time of the last sale of the stock represented by the movable member in registry therewith.

22. The combination in stock indicating apparatus, of a graduated indicator board, a member movable over the face of said board and graduated to show possible selling prices of a particular stock, said board having a receptacle located in registry with said member, a removable indicating device located in said receptacle for indicating the time of the last sale of the stock represented by the movable member in registry therewith, a chute adapted to receive said indicating device from said receptacle, and manually releasable means for normally retaining said device in said receptacle.

23. The combination in stock indicating apparatus, of a movable member representing a particular stock, a stationary member located adjacent said movable member, means for indicating by the adjustment of said movable member the last selling price of the stock represented thereby, and an indicating member adapted to have telescoping engagement with said stationary member for indicating the volume of sales of said stock, said indicating member representing a predetermined number of units of said stock.

24. The combination in stock indicating apparatus, of a movable member representing a particular stock, a stationary member located adjacent said movable member, means for indicating by the adjustment of said member the last selling price of the stock represented thereby, and a series of indicating members adapted to have telescoping engagements with said stationary member for indicating the volume of sales of said stock, each of said indicating members representing a predetermined number of units of said stock, said indicating members being of different distinctive colors, each color representing sales made during a certain hour of the day.

25. The combination in stock indicating apparatus, of a tape movable to represent price changes, said tape being graduated to show the possible selling prices of a particular stock, stationary indicating means with which the latest selling prices of said stock is adapted to be shown by the adjustment of said tape, a rod extending parallel to said tape and in registry therewith, and a plurality of rings having telescoping engagements with said rod, each of said rings representing a certain volume of stock.

26. The combination in stock indicating apparatus, of a tape movable to represent price changes, said tape being graduated to show the possible selling prices of a particular stock, stationary indicating means with which the latest selling prices of said stock is adapted to be shown by the adjustment of said tape, a rod extending parallel to said tape and in registry therewith, and a plurality of rings having telescoping engagements with said rod, each of said rings representing a certain volume of stock, said rings being of different distinctive colors, each color representing sales made during a predetermined interval of time.

27. The combination in stock indicating apparatus, of a movable member graduated to represent the possible selling prices of a particular stock, a stationary indicator to which said member may be adjusted to indicate the latest selling price of said stock, a movable indicator adjustably mounted on said member, and means for adjusting said movable indicator on said member at the ends of successive intervals of time.

28. The combination in stock indicating apparatus, of a series of movable members each graduated to represent the possible selling prices of a particular stock, a stationary indicator common to and with respect to which said members may be adjusted to indicate the latest selling price of each stock, a movable indicator adjustably mounted on each of said members, and time controlled means for moving all said movable indicators into alignment with each other at the end of each of a plurality of successive intervals of time.

29. The combination in stock indicating apparatus, of a series of movable members each graduated to represent the possible selling prices of a particular stock, a stationary indicator to which said members may be adjusted to indicate the latest selling price of each stock, a series of movable indicators each adjustably mounted on one of said members, each of said movable indicators having a projecting part, a pair of bars adapted to engage opposite sides of said projecting parts for simultaneously moving said movable indicators to predetermined positions, and means for actuating said bars at predetermined times.

30. The combination in stock indicating apparatus, of a series of movable members each graduated to represent the possible selling prices of a particular stock, a stationary indicator to which said members may be adjusted to indicate the latest selling price of each stock, a series of movable indicators each adjustably mounted on one of said members, each of said movable indicators having a projecting part, a pair of bars adapted to engage opposite sides of said projecting parts for simultaneously moving said movable indicators to predetermined postions, and means comprising a cam having a predetermined speed of rotation for actuating said bars at predetermined intervals.

31. The combination in stock indicating apparatus, of an endless movable member graduated to represent the selling prices of a particular stock, a stationary indicator with respect to which said graduations are adjustable to show the current selling price of said stock, a second indicator carried by said member and adjustable thereon, and a stationary graduated scale to which said last named indicator is adjustable to show the selling price of said stock at the beginning of a period.

32. The combination in stock indicating apparatus, of an endless movable member graduated to represent the selling prices of a particular stock, a stationary indicator with respect to which said graduations are adjustable to show the current selling price of said stock, a second indicator carried by said member and adjustable thereon, and a stationary graduated scale to which said last named indicator is adjustable to show the selling price of said stock at the beginning of a period, said scale being graduated according to a logarithmic formula of a character whereby said member is movable to equal extents upon equal percentages of change of price when representing stocks sellings at widely different prices.

33. The combination in stock indicating apparatus, of an elongated movable member graduated to represent the possible selling prices of a particular stock, a support with respect to which said member is movable, an indicator element on said support with reference to which said member may be adjusted to indicate successive selling prices of said stock, a marker having a sliding frictional engagement with said member, a graduated scale mounted on said support adjacent said member, and a stop on said support adapted to engage said marker to effect movement of the latter on said member when said member is adjusted and thereby show on said scale the limit of movement in one direction of said selling price.

34. The combination in stock indicating apparatus, of a series of endless members movable in parallel paths and each bearing graduations on a logarithmic scale representing the possible selling prices of a particular stock, said scale being so constructed and arranged that equal percentages of change of price in stocks selling at widely different prices will be represented by equal movements of the respective members representing said stocks, and a panel located within said endless members and having a series of transversely extending graduation lines located behind the front stretches of and common to all of said members and with respect to which the graduations on said members may be adjusted to indicate the selling prices of said stocks.

35. The combination in stock indicating apparatus, of an elongated member movable longitudinally and having graduations on a logarithmic scale representing possible selling prices of a particular stock, said scale being so constructed and arranged that said member is movable to equal extents upon equal percentages of change of price when representing stocks selling at widely different prices, and a stationary indicator comprising a series of indicator lines extending transversely to the direction of movement of said member and spaced apart according to a logarithmic scale to indicate percentage of changes in price of the stock represented by said member.

36. The combination in stock indicating apparatus, of a member movable in a linear path and representing a particular stock, a stationary indicator, an indicator mounted for slide adjustment on said member and held by frictional contact in adjusted position thereon for movement therewith, and a stationary member adapted to engage said indicator to effect movement thereof on said movable member when said movable member is moved from any predetermined position.

EDWIN M. SCHANTZ.